(12) United States Patent
Wehr et al.

(10) Patent No.: US 9,371,883 B2
(45) Date of Patent: Jun. 21, 2016

(54) INERTIAL TERRAIN TRANSIT EVENT MANAGER APPARATUS

(76) Inventors: Robert H. Wehr, Arlington, TX (US); Donald N. Riggs, Keller, TX (US)

( * ) Notice: Subject to any disclaimer, the term of this patent is extended or adjusted under 35 U.S.C. 154(b) by 90 days.

(21) Appl. No.: 13/507,761

(22) Filed: Jul. 26, 2012

(65) Prior Publication Data
US 2014/0151169 A1 Jun. 5, 2014

Related U.S. Application Data

(60) Provisional application No. 61/574,163, filed on Jul. 28, 2011.

(51) Int. Cl.
*F16F 9/52* (2006.01)

(52) U.S. Cl.
CPC ....................................... *F16F 9/52* (2013.01)

(58) Field of Classification Search
CPC ......... F16F 9/52; F16F 9/523; F16F 2222/02; F16F 2222/12; F16F 2224/041; F16F 2224/048; F16F 2234/04; F16F 2234/06
USPC ................ 188/266.7, 276, 277, 283.1, 322.5; 267/64.24
See application file for complete search history.

(56) References Cited

U.S. PATENT DOCUMENTS

| | | | | | |
|---|---|---|---|---|---|
| 2,196,436 | A | * | 4/1940 | Briggs | 188/276 |
| 2,821,268 | A | * | 1/1958 | Bourcier | 188/277 |
| 3,070,192 | A | * | 12/1962 | Barkalow | 188/276 |
| 3,656,633 | A | * | 4/1972 | Ostwald | 188/275 |
| 4,369,864 | A | * | 1/1983 | de Carbon | 188/277 |
| 4,457,409 | A | * | 7/1984 | Fukushima et al. | 188/282.5 |
| 5,074,389 | A | * | 12/1991 | Slocum | 188/277 |
| 5,743,362 | A | * | 4/1998 | Clinard et al. | 188/277 |
| 6,161,821 | A | * | 12/2000 | Leno et al. | 267/64.24 |
| 7,159,699 | B1 | * | 1/2007 | Tine, Jr. | 188/282.4 |
| 7,931,132 | B2 | * | 4/2011 | Braun | 188/266.7 |
| 2001/0025752 | A1 | * | 10/2001 | Crawley et al. | 188/266.7 |
| 2006/0086580 | A1 | * | 4/2006 | Fleischer et al. | 188/266.1 |

FOREIGN PATENT DOCUMENTS

DE 10307362 A1 * 9/2004
EP 2282077 A1 * 2/2011

* cited by examiner

*Primary Examiner* — Thomas J Williams
(74) *Attorney, Agent, or Firm* — David Prashker, Esq

(57) ABSTRACT

The present invention is a networkable, peripherally valved hydraulic shock absorber and damper apparatus which is a substantial improvement and major advance over the shock absorber and damping systems conventionally known to date. The apparatus employs an elevated viscosity hydraulic fluid as a damping medium; and presents a unique structural arrangement that utilizes peripheral valving to shunt a high viscosity hydraulic fluid between the peripheral edges of the piston mechanism and the cylinder wall.

34 Claims, 5 Drawing Sheets

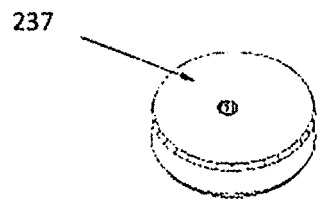
Fig. 3
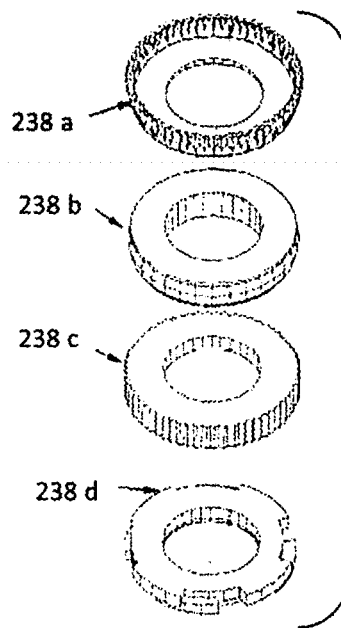
Fig. 4
Fig. 5
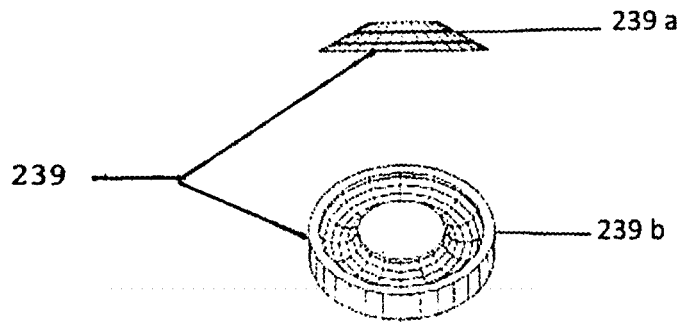

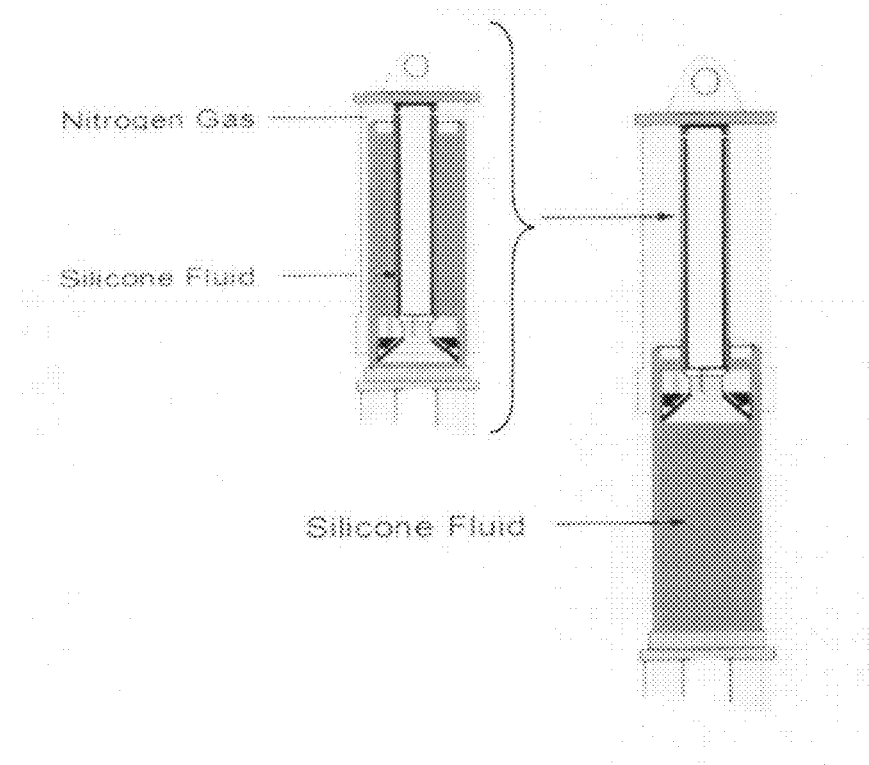

INERTIAL TERRAIN TRANSIT EVENT MANAGER APPARATUS

PRIORITY CLAIM

The present invention was first filed on Jul. 28, 2011 as U.S. Provisional Patent Application Ser. No. 61/574,163. The legal priority and benefits of this first filing are expressly claimed herein.

FIELD OF THE INVENTION

The present invention relates generally to a shock absorber, damping, and rebounding apparatus for managing contact impact forces as well as the transfer, thermal conversion, and dissipation of kinetic energy between interacting systems, such as the sprung weight or position of a vehicle and the unsprung weight or posture of a vehicle. Particularly, the present invention relates to and is directed toward marked improvements of the management of that kinetic energy with using a hydraulic shock absorber apparatus of the type employing a fluid filled rigid or flexible cylinder and means for forcing the fluid reciprocally through a valving system with a piston arrangement.

BACKGROUND OF THE INVENTION

Hydraulic Shock Absorbers

Conventional piston-type hydraulic shock absorbers typically comprise a fluid-filled cylinder and piston arrangement; and include a piston head attached to an input shaft, whereby the input forces are axially applied to the shaft and initiate reciprocal movement of the piston head within the internal bore volume of the cylinder. In action, reciprocation of the piston head displaces a quantity of hydraulic fluid (typically a petroleum based oil) through an orifice, a controlling port, or a metering valve—whereby the input kinetic energy is dissipated by displacement of the hydraulic fluid through the orifice, port or valve. The travel velocity of the reciprocating piston head, and thus the quantity of kinetic energy dissipated, is controlled by carefully metering the flow speed of the displaced hydraulic fluid to proceed at a prechosen rate.

Many arrangements for achieving an orifice variable with piston head position have been developed; and it is frequently desirable to provide some means of for varying the orifice restriction with the position of the piston head along its stroke. By use of such means, the resistance to hydraulic fluid motion can be made dependent upon and become tailored functions of specified parameter values such as rates of fluid velocity and the position of the piston head within the cylinder bore volume.

A variety of hydraulic fluid flow arrangements which vary with piston position have been developed; and among these, many of the conventionally known hydraulic shock absorbers employ piston arrangements which force a low viscosity, petroleum-based oil or similar liquid through small openings or valves under very high pressure. Such devices may include a circular orifice in the piston through which passes a tapered rod attached to the cylinder wall; these often have varied depth grooves in the side wall of the cylinder and use tapered cylinders in which a fixed diameter piston and spring-loaded valves operate.

A common problem in these conventionally known mechanisms is the inability to arrest or resist rectilinear motion of mechanical parts; and a typical solution has been to employ a piston-cylinder assembly having a restricted passage for hydraulic fluid flowing from one side of the piston head to the other. Other shock absorbing assemblies incorporate grooves or furrows of varying depth into the material substance of the cylinder walls (see for example, U.S. Pat. No. 695,775); or use tapered cylinders in which a fixed diameter piston operates (see for example, U.S. Pat. No. 3,062,331); or dispose one or more complex valves into the passageway (see for example, U.S. Pat. No. 4,113,072).

Also, as merely one vivid additional example of such a solution arrangement, U.S. Pat. No. 4,048,905 discloses a piston cylinder hydraulic snubbing device which employs the gap between ends of a piston ring as a valve orifice. This valve orifice, or piston ring gap, is varied by engagement of the ring with a tapered bore in the cylinder. Thus, on a jounce stroke, the piston ring is compressed against the tapered sidewall of the cylinder and closes the ring gap, thereby increasing piston stroke resistance. On the rebound stroke, the piston ring expands against the tapered sidewall of the cylinder, thereby opening the ring gap and reducing hydraulic resistance to the rebound stroke.

Another routine and commonplace problem encountered by conventional hydraulic shock absorbers involves the overheating, foaming, and cavitation of the petroleum oil (or other liquid) used as hydraulic fluid. It has long been recognized that the heat created by conventional shock absorbers is largely generated either at the orifice, port or valve adjacent the piston or at one end of the cylinder; and such heat accumulates and becomes centered in the hydraulic fluid. In operative terms, this means that the quantitative bulk of the hydraulic fluid must initially absorb the heat energy and itself consequently rise in temperature before the flowing fluid can carry the heat energy to the cylinder walls for subsequent transfer and dissipation. Thus, over time and expected duration of use, the hydraulic fluid continuously suffers from repetitious heating effects and frequently severely degrades over time from over-heating, foaming, and cavitation in-situ.

A commonly employed solution for this heat problem is to pressurize the hydraulic fluid chamber with a coolant such as gaseous nitrogen in order to control internal vapor pressures, reduce hydraulic fluid foaming and fade, and thereby improve performance. More recent attempts to improve shock absorber performance have also led to the use of electronic or computer controlled valving in order to provide an acceptable level of performance over a wider range of operational conditions. However, by employing such extrinsic active valve controls, the time-lag occurring between the heat sensing event and the act of actual damping prevents real time synchronicity. As a result, both the reliability and the manufacturing cost of the typical shock absorber apparatus have now become very significant factors in the design of an adequate damper and/or suspension system for a vehicle.

Dampers and Damping Systems

Dampers are specific devices and constructions which act and are characterized by their ability to convert kinetic energy to heat energy. Such devices are typically used in wheeled vehicles and with different kinds of aircraft to absorb kinetic energy resulting from contact impact shocks and terrain caused vibrations. Merely exemplifying and representing the range and variety of conventionally known damper devices and damping systems are those disclosed by U.S. Pat. Nos. 5,743,362; 5,347,771; 5,076,403; and 5,036,633 respectively.

In one exemplary type of damper, the kinetic energy causes a piston to move through a cylinder containing viscous fluid. An orifice is provided such that the hydraulic fluid can flow around the moving piston to absorb the kinetic energy and then to convert the kinetic energy resulting from contact impact shocks and terrain caused vibrations into heat energy. However, it has been long recognized that changes in operating temperature can greatly alter the viscosity of the hydraulic fluid such that, at ever-higher operating temperatures, the fluid becomes ever-less viscous, and the energy converted by the damper markedly decreases. Consequently, the long recognized variations in damper performance owing to large changes in operating temperature makes the use of such conventional damping devices and systems unreliable, and often unacceptable, in many instances and desired applications.

Accordingly, a substantial and long recognized need remains today for an improved shock absorber and damper apparatus which will function reliably over a wide range of operating temperatures; and also avoid, or markedly reduce, or meaningfully eliminate the many defects now routinely present in conventionally available shock absorbing and damping systems. In particular, a substantial need still exists for a shock absorber apparatus which lacks the propensity to foaming of its fluid and other thermally-related degradations of performance, as well as having close time-wise synchronicity between sensing the kinetic event to be damped and applying appropriate damping.

SUMMARY OF THE INVENTION

In its most general structural form, the present invention is an inertial terrain transit event manager apparatus comprising:

an elongated hollow cylinder having an end wall with a pre-sized opening, a closed end wall, at least two discrete solid sidewalls, and an extended internal bore volume;

a pressure-resistant compartment barrier positioned between said sidewalls of said cylinder which divides said extended internal bore volume of said cylinder into two adjacently located separated compartments constituting a discrete gas-containing spatial region and a discrete hydraulic fluid-containing spatial region;

a reciprocating piston mechanism disposed and moveable within said extended internal bore volume of said cylinder, said piston mechanism being comprised of (α) at least one displaceable piston head located within said hydraulic fluid-containing spatial region, and (β) at least one piston rod which passes through said open end wall of said cylinder, is capable of up-strokes and down-strokes repeatedly within said internal bore volume of said cylinder, and will initiate movement and displacement of said piston head on-demand within said hydraulic fluid-containing spatial region;

a viscous silicone-based fluid capable of motion disposed within the compartment volume of said hydraulic fluid-containing spatial region of said cylinder, wherein compression force and kinetic energy is imparted to said viscous hydraulic fluid via the displacement of said piston head within said hydraulic fluid-containing spatial region;

a compressible gas held at a predetermined pressure within the compartment volume said gas-containing spatial region of said cylinder;

intrinsic damping-force control means joined to that portion of said piston mechanism located within the compartment volume of said hydraulic fluid-containing spatial region of said cylinder, wherein said passive damping-force control means is comprised of a preformed article which
(i) has known dimensions and configuration,
(ii) is fashioned of a deformable material having a known coefficient of thermal expansion,
(iii) is able to absorb the resistance of said viscous hydraulic fluid when compressed within said hydraulic fluid-containing spatial region,
(iv) is able to impart changes to the flow angle and flow rate of said viscous hydraulic fluid when compressed within said hydraulic fluid-containing spatial region,
(v) is sufficient to convert at least a portion of the kinetic energy then present in said flowing viscous hydraulic fluid into heat, and an annular gap of dynamically adjustable and temperature variable size located between said preformed article and each cylinder sidewall of said hydraulic fluid-containing spatial region, said annular gap altering its size in accordance with changes in dynamic fluid-flow and temperature, and serving as an on-demand size expanding and size narrowing peripheral valve which allows differing quantities of flowing viscous hydraulic fluid to pass through during the up-stroke and down-stroke movement of said piston mechanism.

A second aspect and highly preferred format of the present invention is an inertial terrain transit event manager apparatus comprising:

an elongated hollow cylinder having an end wall with a pre-sized opening, a closed end wall, at least two discrete solid sidewalls, and an extended internal bore volume;

a pressure-resistant compartment barrier positioned between said sidewalls of said cylinder which divides said extended internal bore volume of said cylinder into two adjacently located separated compartments constituting a discrete gas-containing spatial region and a discrete hydraulic fluid-containing spatial region;

a reciprocating piston mechanism disposed and moveable within said extended internal bore volume of said cylinder, said piston mechanism being comprised of (α) a displaceable piston head located within said hydraulic fluid-containing spatial region, and (β) a piston rod which passes through said open end wall of said cylinder, is capable of up-strokes and down-strokes repeatedly within said internal bore volume of said cylinder, and will initiate movement and displacement of said piston head on-demand within said hydraulic fluid-containing spatial region;

a viscous hydraulic fluid capable of motion disposed within the compartment volume of said hydraulic fluid-containing spatial region of said cylinder, wherein compression force and kinetic energy is imparted to said viscous fluid via the displacement of said piston head within said hydraulic fluid-containing spatial region;

a compressible gas held at a predetermined pressure within the compartment volume said gas-containing spatial region of said cylinder;

intrinsic damping-force control means joined to that portion of said piston mechanism located within the compartment volume of said hydraulic fluid-containing spatial region of said cylinder, wherein said intrinsic damping-force control means is comprised of a preformed article which
(i) has known dimensions and configuration,
(ii) is fashioned of a deformable material having a known coefficient of thermal expansion,
(iii) is able to absorb the resistance of said viscous fluid when compressed within said hydraulic fluid-containing spatial region, (iv) is able to impart changes to the flow angle and flow rate of said viscous fluid within said hydraulic fluid-containing spatial region, (v) is sufficient to convert at least a portion of the kinetic energy then present in said flowing viscous fluid into heat, and an annular gap of temperature variable size located between said preformed article and each cylinder sidewall of said hydraulic fluid-containing spatial region, said annular gap serving as a higher-temperature size expanding and lower-temperature size narrowing peripheral valve which allows temperature-differing quantities of flowing viscous hydraulic fluid to pass through during the up-stroke and down-stroke movement of said piston mechanism; and extrinsically activated damping-force control means positioned in-part externally to said cylinder and disposed in-part internally within the compartment volume of said hydraulic fluid-containing spatial region of said cylinder, said extrinsically applied damping-force control means being in controlling communication with said piston mechanism, and being able to independently direct and control the quantum of damping force then being applied to the kinetic energy of said flowing viscous hydraulic fluid.

BRIEF DESCRIPTION OF THE DRAWING

The present invention can be more easily understood and better appreciated when taken in conjunction with the accompanying Drawing, in which:

FIG. 3 is an illustration of the core plate typically present in a multiple part piston head construction of the ITTEM apparatus;

FIG. 4 is an illustration of a series of individual head segments typically present in a multiple part piston head construction of the ITTEM apparatus;

FIG. 5 is an illustration of the range of styled piston head caps typically present in a multiple part piston head construction of the ITTEM apparatus;

FIG. 8 is an illustration of a semi-parallel, gas-adjustable embodiment of the ITTEM apparatus.

DETAILED DESCRIPTION OF THE INVENTION

Figure 1:
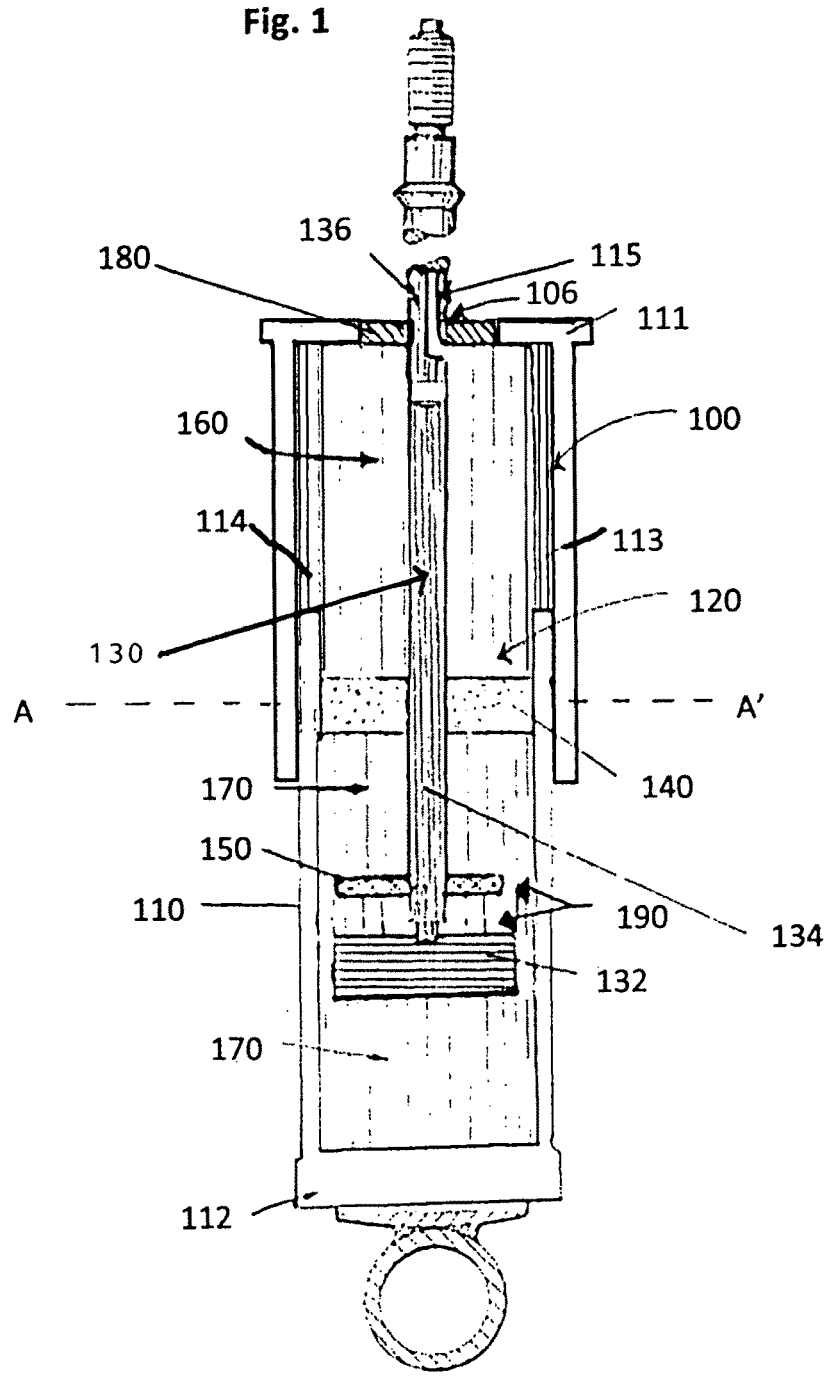
FIG. 1 is a cross-sectional view of a minimalist operative embodiment of the ITTEM apparatus.

The present invention is a networkable, peripherally valved hydraulic shock absorber and damper apparatus which is a substantial improvement and major advance over the shock absorber and damping systems conventionally known to date. The apparatus employs an elevated viscosity non-petroleum fluid as a damping medium; and presents a unique structural construction that utilizes peripheral valving to shunt a high viscosity hydraulic fluid between the peripheral edge of the piston head and the cylinder wall.

In particular, the invention is an Inertial Terrain Transit Event Manager (or "ITTEM")—an apparatus suitable for absorbing, attenuating, adapting, preventing, and diffusing deflections and other kinetic energy events; and in which the wheels or treads, suspension system, or supporting undercarriage of a vehicle or aircraft transfer impact shock forces and oscillation energy to the body of the vehicle or aircraft then engaged in the process of contacting a solid surface or crossing terrain. As such, the ITTEM is a shock absorber and damper apparatus of the general type having a hydraulic cylinder and reciprocating piston; is an apparatus suitable for managing initial impact shocks as well as controlling rebound effects; and can effectively control ride-height when combined with an incorporated or associated spring capability (metal springs and/or compressed gas), as well as manage ride-height (either passively with spring capability or actively with ride-height control decoupled from that spring capability).

As is described in greater detail hereinafter, the cylinder of the ITTEM apparatus contains a reciprocating piston mechanism and a discrete compartment whose volume is desirably filled with a silicone-based hydraulic fluid of elevated viscosity, this viscous hydraulic fluid having only slight compressibility under pressure and preferably exhibiting a pseudo-plastic flow when pressurized. As a result, with the occurrence of impact shock forces and oscillation energy, a displacement and upward-stroke movement of a piston head is initiated within the internal bore volume of the cylinder; which in turn creates an intense compression force and hydraulic pressure upon the viscous hydraulic fluid contained therein; and also generates an increasing kinetic energy in and fluid flow for the viscous hydraulic fluid, which takes the form of fluidic bow-waves and/or ultrasonic shock waves.

Thus, when moving through the internal bore volume of the cylinder, these flowing fluid waves will first encounter a deformable flow baffle or other structural form of intrinsic damping-force control means; and then are directed in flow direction to enter an open channel pathway of an thermally expandable annular gap, which is located adjacently between the piston head and the sidewalls of the cylinder. This thermally expandable annular gap not only controls and directs the wave flow path of the viscous hydraulic fluid, but also serves as a temperature expanding peripheral valve.

In function and overall effect therefore, the open channel of the thermally expandable annular gap acts as a peripheral control gateway and release portal of temperature variable size for the ingress and egress of moving viscous fluid waves generated by fluid resistance to piston head displacement within the bore volume of the cylinder; and in combination with the deformable flow baffle or other chosen structural format (passive, or active, or both of these), will provide greatly enhanced shock absorbing capabilities and effective damping for the apparatus as a whole.

In this manner, the organization of the ITTEM apparatus utilizes peripheral valving to shunt hydraulic fluid between the peripheral edge of the piston head and each of the cylinder sidewalls (or in the alternative, the periphery of a nested piston and the flow-channel adjacently located by it); and manages and directs that flowing fluid into an open channel pathway lying between the piston periphery and the cylinder—all without the use of any additional components.

Notably also, the ITTEM apparatus performs the function of damping control via different modes of damping, which include: velocity-gradient-based damping, laminar-flow-damping, turbulent-flow-damping, damping in subsonic-through-Machian flow regimes; as well as the multiple transitional-flow instances occurring between these via unique hydrodynamic configuration.

Major Advantages and Notable Benefits of the ITTEM Apparatus

Among the marked advantages and many desirable benefits of the ITTEM apparatus are the following:

1. The ITTEM apparatus uses and takes advantage of currently available real-time electronic control systems; and has the capability to control non-linear aspects of transient fluid flow dynamics; and provides the ability to reduce the time-lag between the sensing of an impact force and effective damping action. These multiple capabilities represent clear differences and major distinctions over conventional hydraulic shock absorber systems.

2. Via the use of thermal expansion means to manage changes in hydraulic fluid viscosity caused by environmental or operational heating, the ITTEM apparatus provides a variable, but always controlled, damping-force response which responds to and can be based on the rate of an externally applied impact force and the rate of impact force change over time for that external impact force.

3. In the unique ITTEM apparatus comprising the present invention, the shape and other topographical details of the piston head, as well as the chosen structural form of the intrinsic damping-force control means, can be employed to markedly alter the mode and manner of resistance to hydraulic fluid flow around the piston; as well as to initiate and affect resistance changes as a factor and function of the compressed fluid's acceleration, velocity and viscosity.

4. The ITTEM apparatus allows the use of either passive and/or active structural implementations as discrete intrinsic damping-force control means. The available range of choices provides a nearly limitless degree of variance for the application of damping-force control with respect to the velocity, acceleration, and stroke length of the piston mechanism and flowing viscous hydraulic fluid being damped.

5. Via the instant ITTEM apparatus, the use of low-cost and robust electronic control systems and the sensors associated with them [and/or advanced fluid-logic implementations] are available as extrinsically activated and applied damping-force control means; and the resulting damping affects effects achieved in-situ are both dynamic and reflective of real world use circumstances.

Thus, the dynamic range of hydraulic fluid resistance and kinetic energy exchanges can be predicted in advance of use; and the damping system construction made dependent on any combination of fluid flow rate relative to the piston or displacement of fluid, or frequency of damper reciprocation—as needed for or appropriate to the many different foreseeable applications and intended modes of operation.

6. The ITTEM apparatus can completely manage the interface existing between many different kinds of mechanical and electrical systems conventionally used today and their ambient environment for a wide range of vehicles and aircraft. The present invention can be advantageously employed with many different wheeled vehicles and aircraft on the ground, and the terrain they cross Thus, the expected variety of applications today includes, but is not limited to: wheeled vehicles, such as automobiles, buses, and trucks; treaded vehicles such as bulldozers and tanks; tracked vehicles such as trolley cars, railroad cars, railed tankers, locomotives and electric trams; and aircraft such as helicopters and winged airplanes capable of landing on a ship's deck, or on a landing pad, or upon the ground; as well as being able to travel over and cross the existing terrain.

7. The ITTEM apparatus provides continuous granular control—at very small increments of resolution of time and/or space—to vary adaptively the strength and duration of available damping-force and rebound; and is sufficient to fit the moment-by-moment and millimeter-by-millimeter upstroke and down-stroke velocities and frequencies. Moreover, in order that the amplitude and frequencies of damping be synchronous to the greatest extent possible with the up-stroke or down-stroke of the piston mechanism, these structural controls will deliver the appropriate frequencies and amplitudes of damping synchronously with the impact events being damped—either passively with hydro-mechanical implementation, or via amplification modalities including but not limited to audio-type amplification chips and circuits.

8. The range of alternative embodiments available for use as the ITTEM apparatus allow for a more granular effect—at very small increments of resolution of time and/or space—for damping of terrain-crossing kinetic events, compared with conventionally known devices and systems. In the present invention, the trace of oscillations between the sprung and unsprung weight of a vehicle is nearly or completely synchronous with the trace of damping-force; and the peaks of relative speed-of-motion between the unsprung weight/posture and the sprung weight/position of the vehicle are synchronous (or nearly so) with the peaks of damping-force applied, and exactly (or closely) coincide in relative amplitude with the peaks of damping-force applied 9. In constructing the ITTEM apparatus, the availability today of low-cost, robust electronic control systems and the sensors associated with them, as well as the use of advanced fluid-logic implementations, allows dynamic and predictive behaviors of damping systems to be implemented. The resistance of the apparatus to the expected impact force changes can be made to be dependent upon any combination of rate, displacement or frequency of impact forces as appropriate to different applications and modes of use.

I. Specific Embodiments of the ITTEM Apparatus

A wide and diverse range of embodiments comprising the ITTEM apparatus can be constructed. Merely representative and illustrative of the available construct alternatives are the two particular examples provided below. It is expressly understood, however, that the two embodiments presented in detail herein are neither limiting nor restrictive of the many other constructions and formats that are available to meet the particular conditions or individual needs of the intended user.

As presented in great detail below, both an operative minimalist format and a far more sophisticated and complex non-minimalist format are described in sequence—in order that the essential structural component parts of the invention be easily recognized and quickly distinguished from the more desirable optional structural features and additions present in the preferred constructions. As such, the two described and illustrated embodiments represent structural alternatives revealing and demonstrating the true scope and breadth of the invention.

A. An Operative Minimalist Structural Format

FIG. 1 shows a simple construct and minimalist embodiment of the ITTEM invention. As seen therein, the shock absorbing and damping apparatus 100 is of the cylinder and piston type.

The apparatus 100 as whole comprises an elongated and hollow cylinder which appears in FIG. 1 as a single housing 110 having an upper end wall 111 with one open end 106, a closed lower end wall 112, two discrete solid sidewalls 113 and 114, and an extended internal bore volume 120.

A pressure-resistant compartment barrier 140 is transversely positioned along the axis AA' between the sidewalls 113 and 114; and this pressure-resistant barrier 140 divides the extended internal bore volume 120 of the cylinder housing 110 into two adjacently located separated compartments constituting a discrete gas-containing spatial region 160 and a discrete hydraulic fluid-containing spatial region 170.

As shown in FIG. 1, the pressure resistant compartment barrier 140 is a single structural entity; provides a pressure-tight fitting for the boundary of the gas-containing region 160; and also presents a resilient fluid-tight surface at the boundary of the hydraulic fluid-containing region 170.

For this purpose, the pressure resistant compartment barrier 140 interface lying between the fluid-containing region 170 and the gas-containing region 160 is composed of a durable and flexible, non porous material exemplified by, but not limited to, substances such as rubber, synthetic rubber, silicone elastomers, teflon, flexible metal bellows, etc. Each of these suitable materials is either slideable as an inherent attribute; or can be made in the form of a rolling boot, such as those used in conventional air-inflated ride-height-adjustable shock absorbers.

The apparatus 100 also comprises a reciprocating piston mechanism 130 which is disposed and moveable throughout the extended internal bore volume 120 of the cylinder housing 110. The piston mechanism 130 includes a displaceable piston head 132; a fixed piston rod (or support shaft) 134 which passes through the gas-containing region 160, and the hydraulic fluid-containing region 170; and a distal end 136 of the piston rod 134 which passes through the open end 106 in the upper wall 111.

It will be recognized also that this minimalist piston mechanism 130 is depicted in FIG. 1 as a one-part piston head; which is formed of solid matter; has only smooth exterior surfaces and faces; and does not present or include any primary orifices or valves as such.

Nevertheless, in non-minimalist embodiments, it will be clearly understood that the piston head can alternatively be comprised of multiple segments; can optionally present one or more surface faces and features which topographically are neither smooth nor regular; and can also optionally have a variety of open grooves or furrows over its exterior surfaces.

Also as shown in FIG. 1, the displaceable piston head 132 is located within said hydraulic fluid-containing spatial region 170; and the piston rod 134 is capable of up-strokes and down-strokes repeatedly over the length of the extended internal bore volume 120 of the cylinder housing 110, and will thereby initiate movement and displacement of the piston head 132 on-demand.

Disposed within is the open end 106 of the upper wall 111 of the cylinder housing 110 is a thermally expandable seal 180 through which the distal end 136 of the piston rod 134 travels. The expandable seal 180 maintains the integrity of the internal bore volume 120 as the distal end 136 of the piston rod 134 travels through the open end 106 in the upper wall 111.

In addition, a gas portal 115 is disposed within the traveling distal end 136 of the piston rod 134; and this gas portal 115 is suitable for introducing pressurized gas into the spatial volume of the gas-containing region 260. Not shown within FIG. 1 is a gas valve and a source of pressurized gas which can be connected to the gas portal 115.

Via the gas portal 115, the gas-containing spatial region 160 of the cylinder housing 110 is filled with a suitable compressible gas such as nitrogen. Once filled with a predetermined mass of gas—which corresponds, at any specific increment of the piston's stroke (such as a full extension) to a predetermined pressure—the compressible gas lying within the gas-containing region 160 serves as an effective pressure reference; and, optionally, also serves as the rebounding medium for the apparatus as a whole.

In this manner, the compressible gas is held (for any given piston-stroke direction and position) at a predetermined pressure within the compartment volume of the gas-containing spatial region of the cylinder; and this compressed gaseous mass thus serves as a reference pressure volume for the intrinsic damping-force control means. In addition to its primary purpose and function, the pressurized gas within the compartment volume of the gas-containing spatial region can also serve as a normalization/rebound chamber for the apparatus as a whole.

In contrast, the hydraulic fluid-containing spatial region 170 of the invention is filled with a viscous oil (or other highly viscous liquid)—such as a high-viscous silicon-based oil having semi-plastic fluid flow characteristics. The viscous hydraulic fluid is resistant to compression force; and is capable of motion within the compartment volume of said hydraulic fluid-containing spatial region of the cylinder when compression force and kinetic energy is imparted to the viscous hydraulic fluid (via the displacement of the piston head 132 within the hydraulic fluid-containing spatial region 170).

Joined to and surrounding the surface of the piston rod 134 at a location adjacent to the piston head 132 is a single, substantially disc-shaped and flat surface, passive-resistance flow baffle 150, which is one preferred passive example of the intrinsic damping-force control means employed in the present invention. As seen in FIG. 1, the passive-resistance flow baffle 150 is a structural entity integrally joined to the piston rod 134; is composed of resilient matter of a kind which will physically deform in response to the directional displacement of the piston head and the resistance offered by the wave motions of the viscous oil (or other liquid) employed as a hydraulic fluid; thereby either increase or decrease the quantum of hydraulic fluid resistance against the moving piston head as it travels within the bore volume of the cylinder housing—the quantum and manner of resistance in question being imparted to the moving hydraulic fluid by particular direction of travel for the moving piston head within the longitudinal bore volume of the cylinder housing. In essence, therefore, the flow baffle 150 seen in FIG. 1 will control how much damping force is applied as the viscous hydraulic fluid is pushed past it during the up-strokes and down-strokes of the reciprocating piston mechanism 130 within the internal bore volume 120 of the cylinder housing 110.

The disc-shaped resistance flow baffle 150 can be fashioned from a wide variety of suitable resilient materials and thermally expanding chemical formulations. In particular, the substantive material from which the resistance flow baffle 150 is made often will have specified coefficients of thermal expansion that are chosen in advance of apparatus construction; and exhibit specific coefficient of thermal expansion that matches, or is chosen to be greater than, or is sometimes is less than the particular coefficient of thermal expansion of the material(s) constituting the cylinder housing 110. The availability and desired choice of such a specific and chosen in-advance coefficient of thermal expansion for the passive-resistance flow baffle 150 allows the apparatus 100 as a whole to respond differently and alternatively to a wide range of varying operating temperatures with about the same (more or less) quantum of damping force.

In addition, although a flat surfaced disc shape is deemed to be generally operative and useful as the chosen flow baffle design, it is emphatically noted here that the pre-chosen configuration for the flow baffle 150 need not necessarily be either flat surfaced or disc-shaped as such. To the contrary, the overall shape and dimensions of the passive-resistance flow baffle may be varied greatly to meet the particular needs or expected conditions of use; and each chosen variant of a resistance flow baffle shape will offer individual considerations and provide a range of substantially different flow resistance features and thermal expansion characteristics.

Lastly, the apparatus 100 comprises an annular gap 190 of temperature variable size which exists as an open channel pathway between the flow baffle 150 (the passive-resistance, intrinsic damping-force control means) and each cylinder sidewall 113 and 114 present within the compartment volume of the hydraulic fluid-containing spatial region 170. The annular gap 190 serves as a higher-temperature size expanding and lower-temperature size narrowing peripheral valve; and causes temperature-differing flow rates for the moving viscous hydraulic fluid as it passes through the open channel pathway.

As shown by FIG. 1, the annular gap 190 exists between the periphery of the flow baffle 150 and the cylinder sidewalls 113 and 114. This annular gap functions as the peripheral valve for travel of the fluid around the piston head. Under increasing ambient or internally generated temperatures, the flow baffle 150 expands in size and into closer engagement with the cylinder wall, thereby narrowing the overall size of the annular gap 190 between the expanded flow baffle and the cylinder sidewalls.

In contrast, lower ambient temperatures will cause this annular gap size to increase. Thus in these lower temperature instances, the peripheral valve resistance remains constant, regardless of fluid viscosity changes due to ambient or internally generated temperatures.

Note also that damping performance is maintained via this structural arrangement, even under conditions of extreme cold or heat. Internally generated heat is created at that area of the ITTEM apparatus where ambient cooling is most available; and the peripheral valve gap, bounded on one side by the piston head and on the other side by the inner surface face of the cylinder sidewalls, allows the piston assembly to "squeegee" the heat up and down the cylinder wall surfaces for dissipation into the environment. This arrangement also positively manages and effectively controls the applied damping-forces quickly, in real-time requirements and durations.

B. A More Sophisticated & Preferred Embodiment

Figure 2:
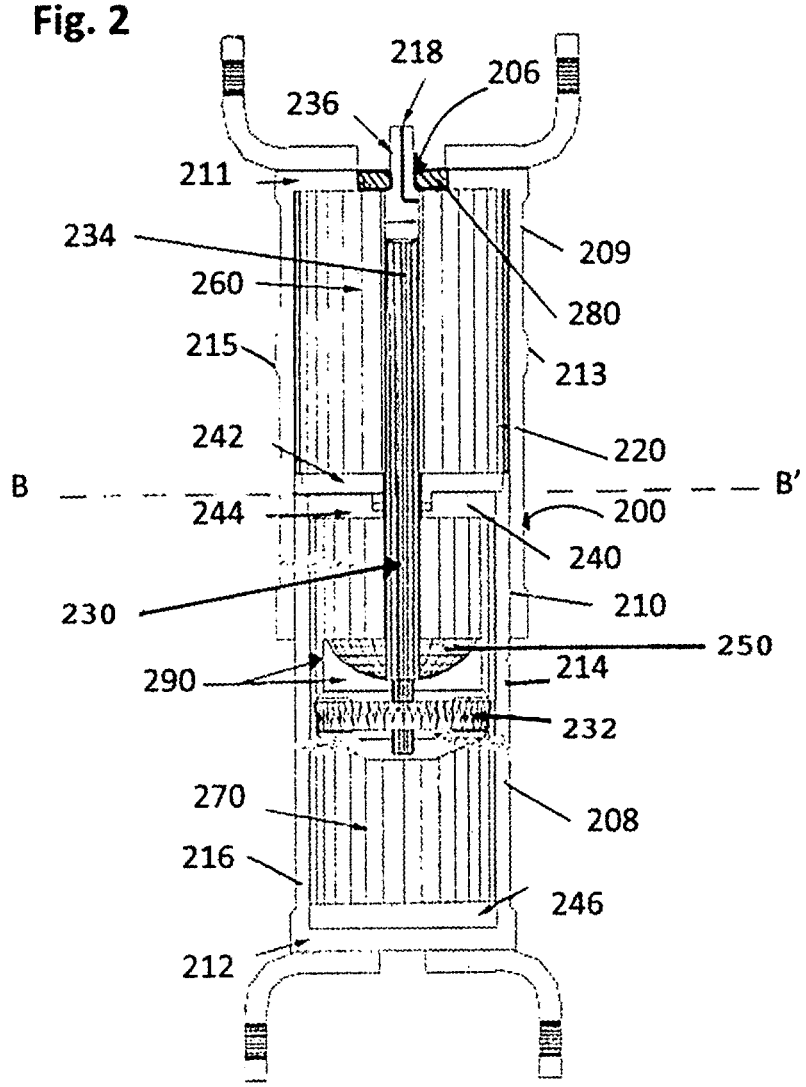
FIG. 2 is a cross-sectional view of a more complex and preferred operative embodiment of the ITTEM apparatus.

A far more structurally elaborate and preferred embodiment of the present invention is illustrated by FIG. 2. This preferred embodiment offers substantial rebound capability, as well as effective temperature compensation management features.

As seen therein, the shock absorbing and damping apparatus 200 is presented which is also of the cylinder and piston type—but is a construct which is markedly different in structure from the minimalist format described above.

As shown by FIG. 2, the preferred shock absorbing and damping apparatus 200 comprises an elongated and hollow unified cylinder casing 210 which presents an elongated central bore volume 220. However, the unified cylinder casing 210 is itself a construct of two slidable parts formed by an outer cylinder envelope 209 which surrounds a portion of and is fitted tightly over a sliding inner cylinder chamber 208, comprising a telescoping assembly.

Notably, the outer cylinder envelope 209 includes an upper wall 211 with an open end 206 and two discrete solid outer sidewalls 213 and 215; while the inner cylinder chamber 208 includes a closed lower wall 212 and two discrete solid inner sidewalls 214 and 216. In addition, it will be recognized and appreciated that the outer cylinder envelope 209 typically has straight linear sidewalls 213 and 215, while the sidewalls 214 and 216 and concomitant inner diameter of the inner cylinder chamber 208 alternatively can be either straight/linear or of varied diameter.

The unified construction of the cylinder casing 210 also provides a generally elongated central bore volume 220 which is divided along the axis BB' via a pressure resistant barrier 240 into a discrete gas-containing region 260 and a discrete hydraulic fluid-containing region 270. Furthermore, because the outer cylinder envelope 209 presents only straight/linear sidewalls 213 and 215, the spatial volume of the gas-containing region 260 will generally be cylindrical in configuration. However, because the sidewalls 214 and 216 of the inner cylinder chamber 208 alternatively can be either straight or inclined over their linear length or any segment thereof, the spatial cavity of the hydraulic fluid-containing region 270 will often be varied in diameter size and overall configuration; and can appear as a tapering and/or cone-shaped volume, or as a non-inclining and generally cylindrically-shaped cavity space, or as a cylindrically-shaped space composed of both tapering and non-inclining segments.

The preferred apparatus 200 also comprises a reciprocating piston mechanism 230 which is disposed and moveable over the linear length of the central bore volume 220 of the unified cylinder casing 210. The piston mechanism 230 includes a multipart piston head core 232; and a fixed piston rod (or support rod) 234 whose linear length passes through both the gas-containing region 260 and the hydraulic fluid-containing region 270, and whose shaft distal end 236 extends through the opening 206 in the upper end wall 211.

Disposed within the open end 206 of the upper end wall 211 of the unified cylinder casing 210 is a thermally expandable seal 280 through which the distal end 236 of the piston rod 234 travels. The expandable annular seal 280 maintains the integrity of the internal bore volume 220 as the distal end 236 of the piston rod 234 travels through the open end 206 in the upper wall 211.

In addition, a gas portal 218 is disposed within the traveling end 236 of the piston rod 234; and this gas portal 218 is suitable for introducing pressurized gas into the spatial volume of the gas-containing region 260. Not shown within FIG. 2 is a gas valve and a source of pressurized gas which can be connected to the gas portal 218. As an alternative, the gas portal can utilize and be attached to any form of intrinsically or extrinsically controlled gas pressure valving by which to control and adjust the pressure within the gas-containing region 260.

The reciprocating piston mechanism 230 is capable of performing up-strokes and down-strokes repeatedly within said internal bore volume 210 of the unified cylinder casing 210; and the fixed piston rod (or support rod) 234 serves as target point of an impact contact sufficient for initiating shaft movement and concomitant displacement of the multipart piston head core 232 within the internal bore volume 220 of the unified cylinder casing 210.

As shown by FIG. 2, a multipart piston head core 232 lies attached to the piston rod 234; and this multipart piston head core is typically comprised of a single core plate 237 joined to two or more kinds of disk-shaped members which appear as a series of individual piston head segments 238 and one or more piston head caps 239.

In essence, the core plate 237 is a single disc-shaped plank upon which a series of piston head segments 238a-238d are individually joined at one surface face; and upon which one or more styles of piston head caps 239 lie attached on the reverse surface face. The core plate 237 as such is illustrated by FIG. 3; the series of individual piston head segments 238a-238d are shown in FIG. 4; and the range of styled piston head caps 239a and 239b are illustrated in FIG. 5.

As regards the configuration of the individual piston caps 239a and 239b mounted upon one surface of the core plate 237, these caps can be fashioned into a variety of different shapes which will alternatively: (i) Change the totality of the available damping force; and/or (ii) the direction of damping force; and/or (iii) the rate of damping force then being applied; and/or (iv) the rate of change when altering the presently applied damping force.

It is also recognized that it may often be more advantageous to have the rate of damping force for a shock absorbing system be markedly different for the compression stroke and extension stroke directions of the reciprocating piston mechanism. To achieve this purpose and result, a simple concave-shaped multipart piston head would provide maximum resistance for the compression stroke. In contrast however, a multipart truncated conical piston head would provide a much lower resistance and damping force rate for the compression stroke.

Moreover, the rate of damping force can be meaningfully modified and altered via a multipart piston head core shaped as a truncated cone with concentric groves around it. This particular structural format for the piston head core will create predictable drag in response to any specific fluid flow rate for the moving viscous hydraulic fluid.

In addition, many kinds of surface changes and face finish adaptations to the overall topography of the exterior surface for the assembled multipart piston head core may be optionally used either to increase or to decrease fluid resistance at various hydraulic fluid velocity ranges. Thus, a simple hemispherical piston head surface is often advantageous; as is a toroidally-grooved exposed surface for the assembled piston head core. Moreover, many other alternative shapes for the topography of the exterior surface are also available by which to adjust the fluid drag in order to meet and satisfy various conditions of hydraulic fluid viscosity and fluid flow rate.

Accordingly, via the gas portal 218, the gas-containing region 260 of the unified cylinder casing 210 is filled to a desired internal pressure with a compressible gas such as nitrogen. Once filled with gas to a predetermined internal pressure, the gas-containing region 260 and its compressible gas serve as an effective shock absorbing compartment for the apparatus as a whole.

Attention is again emphatically directed to the particular functions provided by the gas-containing region 260. Once filled with a predetermined mass of gas—which corresponds, at any specific increment of the piston's stroke to a predetermined pressure—the compressible gas lying within the gas-containing region serves as a positional reference-pressure source, as an effective pressure source by which to counteract in part the shock effect caused by the impact contact forces; and, optionally, also serves as the immediate rebounding means for the apparatus as a whole.

For these purposes, the compressible gas is held (for any given piston-stroke position and direction) at a predetermined pressure within the compartment volume of the gas-containing spatial region of said cylinder; and this compressed gaseous mass thus serves as a reference pressure volume for the intrinsic damping-force control means located elsewhere within the apparatus. In addition, the pressurized gas within the compartment volume of the gas-containing spatial region optionally can serve as a normalization/rebound chamber for the apparatus as a whole.

In contrast, the hydraulic fluid-containing region 270 of the invention is filled with a high viscous oil (or other suitable hydraulic liquid) such as a high-viscous silicon-based oil having semi-plastic fluid flow characteristics. Then, when the impact shock event occurs, the displaced piston head core compresses the viscous fluid; causes fluidic wave motion and fluid flow within the hydraulic fluid-containing region 270; and the kinetic energy carried by the moving waves of viscous oil is initially resisted and controlled, and subsequently is damped and converted into heat energy.

In order to maintain the integrity of the two individual regions 260 and 270 constituting the extended central bore volume 220, a pressure resistant disc-shaped barrier 240 is employed to separate them. The pressure resistant disc-shaped barrier 240 is formed in-part as and appears within the gas-containing region 260 by as a pressure-tight fitted cap 242; and the separation barrier is also formed in-part as and exists within the hydraulic fluid-containing region 270 as a buffer layer 244. Both the fitted cap 242 and the fluid-tight plate 244 are internally linked to each other to form a unitary physical barrier; and both are typically made of resilient, flexible and non porous material as described in text pertaining to FIG. 1, item 140.

In addition, another buffer layer 246 formed of highly-compressible resilient, flexible and non-porous material is optionally disposed adjacent to the closed lower wall 212 of the inner cylinder chamber 208. In many instances, this optional buffer layer 246 may be formed and implemented as a hollow, inflatable-ring bladder of toroidal shape.

It will be appreciated that the apparatus 200 can employ either or both passive damping-force control means and active damping-force control means as integrated components. Accordingly, joined to and surrounding a portion of the piston rod 234 at a location adjacent to the multipart piston head core 232 is a single, substantially dome-shaped flow baffle 250 constituting one embodiment of the passive-resistance flow control means. The dome shape of the passive-resistance flow baffle 250 seen in FIG. 2 will control how much damping force is applied as the viscous hydraulic fluid is pushed past it during the up-strokes and down-strokes of the reciprocating piston mechanism 230 within the bore volume of the inner cylinder chamber 208. Although only a single flow baffle appears in FIG. 2, it will be understood that two or more individual flow baffles may be employed simultaneously at any time.

The passive-resistance flow baffle 250 will always be a structural entity located and integrally joined to that part of the piston shaft assembly 234 and 290 which is present within the compartment volume of the hydraulic-containing fluid region 270; will be composed of resilient matter of a chemical kind and formulation which will physically deform in response to the directional displacement of the piston head and the resistance offered during compression of the viscous oil (or other liquid) employed as a hydraulic fluid; and will cause either an increase or a decrease in the quantum of hydraulic fluid resistance offered against the compression stroke of the moving piston head core as it travels within the bore volume of the hydraulic-containing fluid region 270— the quantum and manner of fluid resistance in question offered by the moving hydraulic fluid varying with the compression force of the moving piston head core within the longitudinal bore volume of the hydraulic-containing fluid region 270. In essence, therefore, the effects of the flow baffle 250 seen in FIG. 2 will dictate and control how much passive damping force is applied to the moving viscous hydraulic fluid which flows around and over it during the compression-strokes of the reciprocating piston mechanism.

A wide variety of shapes for the passive-resistance flow baffle are expected and contemplated for use in order to adapt this invention for a wide range of different applications, and in order to control how much damping force is applied as the hydraulic fluid is forced past it. The flow baffle can be fashioned from many different suitable materials of known chemical formulation; and typically will have prechosen coefficients of thermal expansion that alternatively match that of the cylinder wall material, or are greater than that of the cylinder material, or are less than that of the cylinder wall material. These choices of coefficients of thermal expansion affect the capabilities of the flow baffle; and when properly selected, allow the apparatus 200 as a whole to respond to differences in operating temperature with the about the same (more or less) quantum of damping force.

In addition, the passive-resistance baffle optionally may have a fluted-like perimeter edge surface—i.e., a margin and side-edge topographical feature which provides different amounts of flow resistance and will vary with the details of flow interaction along its fluted edges. Other design choices can include: a baffle segment which provides a uniform expansion space with a smoother edge.

Alternatively, the flow baffle can be a segment having gear like teeth over its surfaces to provide particular flow characteristics at specified speeds of fluid flow; and optionally appear as a baffle set of two or more rotable disks having relief cuts on their perimeter edges such that each of the multiple discrete flow baffles in the set individually rotates at its own individual speed around the same piston rod in-situ.

This last optional design feature deserves further description owing to its ability to rotate on-demand. In every instance, flow baffle rotation must be controlled; and such control can be achieved in alternative modes and manners. Thus, one form of control may be accomplished intrinsically in the form of a threaded piston rod and spring loading of the shaft. Alternatively, rotation control can also be accomplished extrinsically by applying force directly to a concentric rotational portion of the supporting piston rod.

Each embodiment of the preferred apparatus 200 also presents and includes at least one annular gap 290 of temperature variable size/diameter—which exists as an open channel pathway between the flow baffle 250 (the passive damping-force control means) and each cylinder sidewall 214 and 216 defining the perimeter and compartment volume of the hydraulic fluid-containing spatial region 270. The annular gap 290 existing between the piston 290 and the cylinder wall 214 and 216 serves as a dynamically varying open channel pathway; will appear and function as a higher-temperature size expanding and lower-temperature size narrowing, peripheral valve; and will allow size adjustments, including temperature-differing variations, of quantities of flowing viscous hydraulic fluid to pass through in either direction during the up-stroke and/or down-stroke of the piston mechanism 230.

The apparatus 200 illustrated by FIG. 2 also optionally includes (and employs in the more preferred structural formats) at least one form of extrinsically activated damping-force control means positioned in part upon the exterior of or otherwise positioned remotely from the cylinder walls; and disposed in-part internally within the compartment volume of the hydraulic fluid-containing spatial region of the cylinder.

The extrinsically activated damping-force control means is in controlling communication with at least a portion of the piston mechanism, and is independently able to direct and to control the quantum of damping force then being applied to the flowing viscous hydraulic fluid within the hydraulic fluid-containing spatial region of the cylinder.

In many instances, prechosen activation and communication means, such as an electronic control module, are positioned and affixed externally to and remote from the unified cylinder casing 210. The externally affixed activation and communication means are independently able to direct and control the quantum of damping force then being applied to the kinetic energy of the flowing viscous hydraulic fluid. Nevertheless, if and when required or desired, the prechosen activation and communication means, such as an electronic control module can alternatively be disposed and positioned internally anywhere within the extended bore volume of the cylinder, so long as that location does not meaningfully interfere with the other component parts of the apparatus as a whole.

Figure 6:
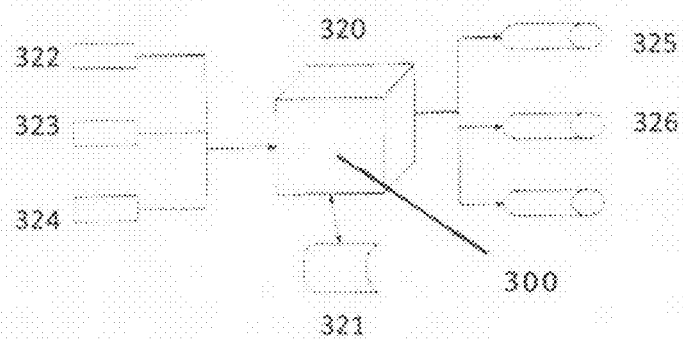
FIG. 6 is an illustration of an electronic control module serving as one component of the extrinsically activated damping-force control means in the ITTEM apparatus.

A desirable system of activation and communication 300 having active damping-force control means employs the electronic control module 320 shown by FIG. 6. As seen therein, the electronic control module 320 has an attached storage unit 321 to keep instructions, to set data points, and to record actual use conditions for later analysis. Also, the control module 320 typically includes an internal clock mechanism so that rates of change over time may be measured.

As a desirable part of the extrinsically activated damping-force control means, a wide variety of measuring and recording sensors may be attached in order to gather data about performance and conditions. In the format shown by FIG. 6, a position sensor 322 will report the extensions of compression of the strut element. Similarly, a pressure sensor 323 will report the gas pressure at the strut valve. Other sensors can direct input from a human operator and may be imputed into the system via an option port 324. In addition, the gas pressure in the strut 326 may be regulated by means of a pressurization system valve 325.

A range of differing active damping adjustments may also be performed with internal elements of the strut 326, such as movable baffle plates. For this purpose, there is desirably an optional additional output port for attaching future actuators and other output mechanism to the electronic control module. Taken together these elements and components form an active control network which effectively and dynamically manages the damping performance of the control system. Since rates of change and historical data are measured, the system 300 may employ historical data to improve future performance.

II. Other Structural Aspects of and Characteristic Features for the ITTEM Apparatus The minimalist and preferred embodiments set forth in detail above are merely two representative constructs illustrating the true scope and breadth of the present invention. A great many other structural variations can be individually introduced into the essential components of the ITTEM apparatus; and the present invention allows for a very wide range of alternative combinations and permutations of features in the construct's design. The range and variety of expected variations and optional modifications include all of those described subsequently herein.

A. The Cylinder & its Internal Bore

1. In accordance with alternative embodiments of the present invention, the elongated bore volume of the hydraulic cylinder housing may have a straight or tapered shape, depending upon the intended application. Thus, in some preferred embodiments, the spatial cavity of the hydraulic fluid-containing region will vary in diameter size and overall configuration; and will appear as a tapering and/or cone-shaped volume, or as a non-inclining and generally cylindrically-shaped cavity space, or as a cylindrically-shaped space composed of both tapering and non-inclining segments.

2. The material substance of the cylinder itself can be one or more of the conventionally known metals, ceramics, and/or alloy composites which are chemically non-reactive, malleable, pressure-resistant, and resilient. Moreover, any of the known surface finishes including, but not limited to etching, sand-blasting, machining, fluid-dynamic boundary-layer finishes such as microperforation, and velocity-gradient moderation finishing methods such as "wetting control" relative to the fluid in use, may be utilized for construction of the cylinder. In this manner, the cylinder itself contributes to the individual tailoring of the damping-force by the careful choice and application of one or more of any of the known surface finishes for the metals, ceramics, and/or composites used in construction of the cylinder.

3. A substantially non-absorbent, compressible fluid medium (of a type including but not limited to an inflatable-ring-bladder and/or a closed cell sponge neoprene ring) can be optionally positioned internally within the internal bore volume at one or at both end walls of the cylinder. This non-absorbent, compressible medium optionally may or may not be inflated and/or preloaded before or after full assembly of the apparatus as a whole; and when present, the non-absorbent, compressible medium positioned in the bore volume adjacent the end(s) of the cylinder will become compressed by the flowing viscous fluid (set into motion by the displaced piston head as it travels through the cylinder bore). Resistance to this flowing viscous fluid by the piston head generates substantial compression force; and concomitantly pressurizes the viscous fluid disposed in the bore volume of the cylinder, thereby limiting the formation of air bubbles.

4. In some instances and embodiments one or more internal surfaces of the cylinder sidewall are serrated along its periphery or margins. These surface serrations aid in controlling the rate of flow for the moving hydraulic fluid when compressed. Accordingly, some embodiments will employ a cylinder sidewall whose surface is longitudinally-grooved along some or all of its periphery margins.

5. In some format implementations of the ITTEM apparatus, the cylinder's diameter and/or roundness will vary in a non-linear fashion to produce specific damping-characteristics at specific increments of the overall stroke.

Also, in other format implementations, the compartment constituting the fluid-containing spatial region and/or the compartment constituting the gas-containing spatial region will be formed as a discrete and isolatable cartridge which can be independently inserted into and then reside for an extended time period within the apparatus; and then, when necessary or desired, be able to be entirely removable on-demand from that apparatus. This particular construction mode for the ITTEM apparatus allows for quick and easy replacement of component parts—a very desirable feature where very heavily use of the vehicle is the norm.

6. A flexible cylinder assembly embodiment of the ITTEM apparatus, which is has come to be called the "ElastoSil Damper", is optionally available as a structural alternative construction to the other formats previously described herein. The major features and marked advantages of the "ElastoSil Damper" are given below.

The structure of the flexible cylinder assembly typically incorporates or affixes a flexible reservoir for the hydraulic fluid during damping and from which the fluid returns to the cylinder during rebound. Also, the flexible cylinder may or may not be optionally surrounded by a discrete flexible compressed-gas-jacket to allow adjustment of the rebound strength and ride-height.

Figure 7:
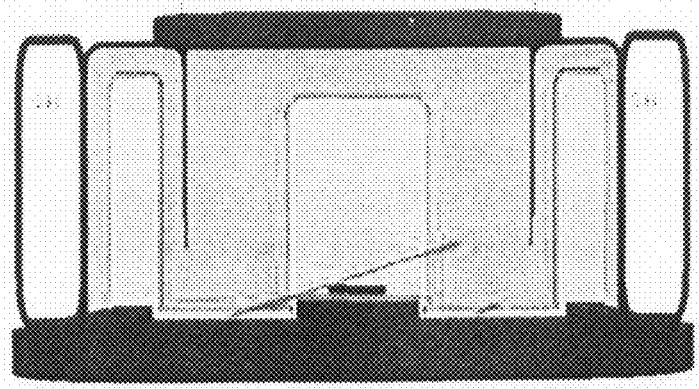
FIG. 7 is an illustration of a flexible cylinder embodiment of the ITTEM apparatus.

This flexible cylinder assembly embodiment can either be a damper apparatus with limited inherent rebound from its flexible material; or be a semi-parallel, gas-adjustable standalone vehicle suspension solution, as is illustrated by FIG. 7

In the latter format and construction shown by FIG. 8, the outer reservoir of the flexible cylinder assembly should be nearly full height and should have a compressed-gas torus jacket completely covering it. Via this structural arrangement, gaseous inflation applies pressure to the entire ElastoSil Damper apparatus; which in turn, allows such inflation to vary the load-bearing capabilities greatly for the vehicle and to adjust the ride-height of the vehicle to a smaller degree.

As an alternative choice and option, the flexible cylinder assembly construction is typically made so that the flexible reservoir for the hydraulic fluid includes at least one aperture whose gap space serves as a flow control valve and whose annular gap can be actively or mechanically varied using a tapered annular insert and an actuator or adjustment screw. The direction of taper and details of the associated baffle and mounting constitute one (but certainly not the only) effective means to control whether damping force increases with stroke speed or decreases with stroke speed in either the down-stroke or the up-stroke.

Yet another variant format is a flexible-cylinder with a convex insert, such that the maximum aperture gap is at zero-flow. This particular format increases damping with each increase of fluid flow; allows damping to be applied to both the up-stroke and the down-stroke of the piston mechanism; will cause a reverse effect and result when the smallest annular gap is set for zero-flow of fluid; and will produce decreasing damping effects with increased fluid flow/stroke-speed. For best results, the convex insert is made a part of the base-plate; and the base-plate/insert combination can be cast or otherwise manufactured in one piece for subsequent use as the heat-dissipation means.

In addition, the flexible cylinder can incorporate or have affixed a flexible reservoir for the fluid during damping and from which the fluid returns to the cylinder during rebound. Also, a flexible cylinder optionally may be surrounded by or affixed to a flexible compressed-gas-jacket to allow adjustment of the rebound strength and ride-height.

Definitionally therefore, this alternative, but highly desirable, flexible structural format is recited as follows:

An inertial terrain transit event manager apparatus comprising:

a flexible cylinder assembly including (i) a flexible first elongated hollow cylinder chamber having an end wall with a pre-sized opening and an associated base-plate, a closed end wall, at least two discrete flexible sidewalls, and an extended internal bore volume;

(ii) a flexible second elongated hollow cylinder shell enclosing the sidewalls of said first cylinder chamber, said second cylinder shell presenting a second extended bore volume and providing at least two nested separated hydraulic fluid-containing spatial regions connected by passageways through said associated base plate at the end wall of said first cylinder chamber;

(iii) a flexible third hollow cylinder framework enclosing said sidewalls of said first and first cylinder chamber and said second cylinder shell, said flexible third cylinder framework constituting a discrete gas-containing spatial region positioned for on-demand application of pressurized gas to compress said nested separated hydraulic fluid-containing spatial regions of said enclosed second cylinder shell;

a fixed piston mechanism disposed and affixed to said base-plate of the extended internal bore volume of said cylinder assembly, said piston mechanism being comprised of
   (α) a piston head located within said hydraulic fluid-containing spatial regions, and
   (β) a base plate supporting said piston mechanism and containing an aperture valve with fluid flow passages connecting the first and second hydraulic fluid-containing spatial regions via the gap space of said aperture valve;

a viscous hydraulic fluid capable of motion disposed within the compartment volumes of said hydraulic fluid-containing spatial regions of said cylinder assembly, wherein compression force and kinetic energy is imparted to said viscous hydraulic fluid via the displacement of said piston head within said hydraulic fluid-containing spatial region;

a compressible gas held at a predetermined pressure within the compartment volume said gas-containing spatial region of said cylinder assembly;

intrinsic damping-force control means joined to that portion of said piston located within the compartment volume of said hydraulic fluid-containing spatial region of said cylinder assembly, wherein said intrinsic damping-force control means is comprised of
   a preformed article which
   (i) has known dimensions and configuration,
   (ii) is fashioned of a deformable material having a known coefficient of thermal expansion,
   (iii) is able to absorb the resistance of said viscous hydraulic fluid when compressed within said hydraulic fluid-containing spatial region,
   (iv) is able to impart changes to the flow angle and flow rate of said viscous hydraulic fluid within said hydraulic fluid-containing spatial region,
   (v) is sufficient to convert at least a portion of the kinetic energy then present in said flowing viscous hydraulic fluid into heat, and
   an annular gap of temperature variable size located between said preformed article and each cylinder sidewall of said hydraulic fluid-containing spatial region, said annular gap serving as a higher-temperature size expanding and lower-temperature size narrowing peripheral valve which allows temperature-differing quantities of flowing viscous hydraulic fluid to pass through during the up-stroke and down-stroke movement of said piston mechanism; and extrinsically activated damping-force control means positioned in-part externally to said cylinder assembly and disposed in-part internally within the compartment volume of said hydraulic fluid-containing spatial region of said cylinder assembly, said extrinsically applied damping-force control means being in controlling communication with that portion of said piston, and being able to independently direct and control the quantum of damping force then being applied to the kinetic energy of said flowing viscous hydraulic fluid.

B. The Piston Mechanism

1. The piston head of the piston mechanism can alternatively be: a solid construction without primary orifices or valve openings in the piston head; or a piston head having a variety of features over its exposed surfaces and faces. Exemplary instances of the latter situation include the nesting of similar or different peripheral-valve implementations, such as a nested piston in a receptacle on the piston face; or a flexible cylinder peripheral valve damper affixed to one or both piston faces.

Also, in accordance with the invention, the piston head can alternatively be formed as a single article structure or a unified multipart core entity.

2. In addition, the topography of the compression-stroke surface face of said piston can be flat surfaced or pre-configured. When the face surface is to be configured, the particular shape for the exposed surface can be selected from one or a combination of shapes selected from the group consisting of: helical, conic, domed, concave, parabolic doomed, parabolic concave, and concave torodial, and concave-Flat "Pie-Pan"—the last for the creation of rotating toroidal "Smoke-Ring" vortexes at the piston-face surfaces.

This wide range and variety of optional surface face shapes provide additional effective means for tailoring the passive minima and maxima of the damping-force, and the damping-rate, as well as for controlling the damping-force distribution over the range of piston stroke and acceleration of stroke, as well as for managing the effectiveness of conversion of kinetic energy into heat.

3. The application of one or more known surface finishes for the metals, ceramics, and composites used in construction of the piston head provide additional means for tailoring the passive minima and maxima of damping-force and damping-rate and damping-force distribution over the ITTEM apparatus' range of stroke and acceleration of stroke. This is achieved by using the above-mentioned choices of surface finishes and shapes in combination to control vortex formation (including but not limited to ring-vortex formation at the piston faces), velocity-gradient, laminar and turbulent flow, and other fluidic and/or surface-effects that influence friction, drag, and other fluidic factors which influence the damping and rebounding characteristics of an ITTEM.

4. The piston rod or rod can optionally be formed as either a solid metal article or as a hollow metal member. One highly desirable implementation of the hollow piston rod format is illustrated by FIG. 8, which shows both an elastosil piston-buffer and a nested piston peak-pressure limiter.

The elastosil piston-buffer is merely one format implementation of the flexible-cylinder peripheral valve damper. In contrast, the nested piston peak-pressure limiter is a floating piston nested within the primary piston; and has a position within the tapered bore in that primary piston which is controlled by a constant-force spring mechanism, so that movement of the nested piston only occurs when stroke-ward face transient peak pressure exceeds a preset threshold value.

It will be noted and appreciated that, in formats of the present invention using a hollow piston rod, it is requires the piston rod be substantially larger in girth or diameter size; and additionally employ the hollow piston rod in a constant-volume chamber and open to the gas-pressurized region of the cylinder. This mode of construction will provide a larger sized, fully-compressed gas volume for the tailoring of the compression-stroke effects upon the gas and/or the hydraulic fluid—in that it allows engineering control over the ratio between minimum full-extension and maximum full-compression gas pressure. Furthermore, this form of construction allows marked weight-savings for the piston rod itself; and because of internal pressurization within the hollow rod, it is far more buckle-resistant for any given linear length and material weight.

Optionally, a bellows assembly may also be affixed to the hollow-piston-rod as a source of reference-pressure, to communicate with the piston mechanism through the hollow piston rod. The use for and value of this optional bellows assembly is the determination of load and fraction of stroke remaining, and/or to provide additional rebound/normalization capability.

5. In addition, if and when a hollow piston rod format and construction is chosen, this construction can optionally also use an internally-telescoping upper member which allows for overall height adjustment on-demand for the piston rod. One format of this optional feature is a turn-buckle arrangement located near the upper attachment point; and is provided with lock-nuts for each end of the turn-buckle, so that the height adjustment (kneeling) can be locked with complete rigidity.

The ability to mechanically lower the ride-height of a vehicle, such as a helicopter or ground vehicle, in the fashion described above, is highly prized within military applications where the vehicle or aircraft in question must present a lower profile for space requirements aboard a transport aircraft for effective use of the cargo space. This structural format allows the lowering of ride-height while retaining suspension in order that the loading and unloading of the lowered vehicle from its air transport retains suspension protection from bottoming-out-impacts which could damage the lowered vehicle.

6. It is often desirable that the piston head or its associated structures further comprise at least one side-load bearing member which has one or more recesses of determined size and shape disposed in an outer peripheral edge thereof in order to allow bushing-like contact by the side-load bearing member to the cylinder wall without blocking fluid flow. This is needed to retain concentricity of the piston-body and shaft with the cylinders comprising the damper, against side loads, including applications such as Macpherson Strut type suspension where the damper provides the axis of steering, serving as the steering pivot as well as a damper.

7. The piston mechanism as a whole is a solid construction which optionally can comprise multiple discrete piston segments, which may be fixed or mobile units relative to each other; and may be formed as nested units, or serially stacked units, or be an arranged organization of both nested and serially stacked units. Consequently, all combinations and permutations of nested and/or serially stacked piston segments—regardless of their size, number, or structural complexity—lie within the scope of the present invention.

8. In many preferred embodiments, the piston head will optionally includes a thermal expansion member. The thermal expansion member can be a separate segment of the piston; or it can be formed as a baffle made of an appropriate thermally expansive material.

Accordingly, the fully constructed piston head optionally may have one or more thermal expansion members attached to it; and also optionally includes one or more controllable (passively or actively by heat, pressure, or fluid-flow rate) fluid-flow-restrictive members; and optionally additionally have one or more discrete baffle members associated therewith, each such optionally present baffle member being actively or passively deformable in response to the flow movement of the silicone oil or other hydraulic fluid. It is noteworthy that with each of these optional, but highly desirable structural formats, the size of the annular gap will either increase or decrease—the specific change in question being imparted by the dynamic flow of the fluid (and directional movement of the piston stroke within the extended bore volume of the cylinder), and the operating temperature(s) at which the apparatus is used.

9. Many constructions of the inertial terrain transit event manager apparatus will exemplify the particular circumstance where the piston head and the cylinder are formed of materials having substantially equal coefficients of thermal expansion. In the alternative, however, many embodiments will present constructs in which where the piston head or its optionally present thermally-expanding member, and the cylinder, are formed of materials having markedly different coefficients of thermal expansion.

In these circumstances, the material substances are chosen so that the fluid displacement for a given damper-stroke or fraction thereof will produce the same or nearly the same damping, regardless of environmental temperature variations or fluid and damper temperature variations engendered by extreme damping activity. The materials chosen for the piston head or its optionally present thermally-expanding member, will in this case, have a greater thermal coefficient of expansion than the substance forming the cylinder. Consequently, as the operational temperature rises and the hydraulic fluid becomes less viscous, the thermally-expanding member (such as a baffle) will expand at a greater rate than the material substance of the cylinder, thus reducing the size of the annular gap (peripheral valve) and thereby constricting its valving function to produce the same resistance and damping with the warmed fluid as it did with the cooler fluid.

10. In some use instances and applications, the piston head will comprise an appropriately-shaped retaining member, and a piston or piston-segment member, with a thermal expansion member interdisposed between them. Typically, the appropriately-shaped retaining member, and the piston or piston-segment member, are made of a pre-selected material having a known coefficient of thermal expansion which is less than or equal to that of the thermal expansion member and/or similar to the cylinder.

In the alternative, there are a number of use conditions under which the thermal expansion member is selected to have a coefficient of thermal expansion greater than the conical-shaped leading member and the load-bearing element.

11. The piston mechanism of the ITTEM apparatus optionally may comprise and include one or more adjacently disposed segments having serrated or longitudinal grooves or a series of baffles with serrations in their periphery. Typically, the grooved or serrated periphery face surfaces of the segments or baffles lie exposed within the compartment volume of the hydraulic fluid-containing region; are longitudinally moveable by associated springy or elastic mechanisms such as elastomeric o-rings, and are radially moveable as well, thereby allowing them to function as a baffle.

The means and control for causing such radial movement is provided by interfacing the series of adjacently disposed segments or baffles to each other using a spiral-spline shaft which extends from the disk-surface of one of the segments and/or baffles to engage a slip-fitting spiral-spline socket in the adjacent segment and/or baffle; or by additional springy or elastic means joined to the segment or baffle, and which can be provided by the intrinsic elasticity of the baffle material itself.

The series of segments and baffles are specifically aligned; and function, when the system is at rest, to vary the alignment of the grooves or serrations of one segment or baffle to those of the next segment or baffle of the series in response to fluid-flow and pressure, over a range from fully-aligned to fully occluded/misaligned. Thus, if and when occluded, the peripheral fluid-flow through the grooves or serrations in the series of segments and baffles would be nearly occluded for great damping force; and alignment of the grooves or serrations would allow considerably more fluid-flow for a softer damping-force. In the case of spiral grooves or serrations the alignment-occlusion can be accomplished without a spiral-spline arrangement.

C. The Hydraulic Fluid-Containing Spatial Region

1. The compartment volume of the fluid-containing spatial region of the cylinder is filled with a slightly compressible silicone-based fluid of elevated viscosity which preferably exhibits pseudo-plastic flow under extreme shear; and which desirably can be blended at will into viscous fluids having a viscosity ranging from about 10 centistokes to about 600,000 centistokes; and which will preferably have a viscosity temperature coefficient below about 0.6.

2. A highly preferred hydraulic fluid is polydimethylsiloxane silicone fluid which exhibits the desired characteristics and properties. A commercially available polydimethylsiloxane silicone fluid is 200(R), 50 CST hydraulic fluid manufactured and sold by Dow Corning Corporation. Many similar commercially sold hydraulic fluids are also commonly known and available.

3. It is desirable that a non-absorbent and compressible medium, of a type including but not limited to an inflatable-toroidal-diaphragm and/or a closed cell sponge neoprene ring, is optionally provided within the compartment volume of the hydraulic-fluid region, at either or both ends of the chamber. When present, this non-absorbent, compressible medium may or may not be inflated as such; can alternatively be preloaded before or after apparatus assembly; and when present can be compressed by the flowing hydraulic fluid as it travels within the cylinder. The resistance of the non-absorbent, compressible medium to this compression force serves to pressurize the hydraulic-fluid containing compartment, thus limiting the formation of air bubbles.

Also, in accordance with alternative embodiments of the ITTEM apparatus, the cylinder may have a internal bore configuration of constant or varied diameter, depending upon the application and intended use circumstances.

D. The Gas-Containing Spatial Region

1. The gas-containing region and its compressible gas serve as an effective shock absorbing compartment for the apparatus as a whole. Attention is emphatically directed to the particular functions provided by the gas-containing region. Once filled with a predetermined mass of gas—which corresponds, at any specific increment of the piston's stroke to a predetermined pressure—the compressible gas lying within the gas-containing region serves as a positional reference-pressure source, as an effective pressure source by which to counteract in part the shock effect caused by the impact contact forces; and, optionally, also serves as the immediate rebounding means for the apparatus as a whole.

2. In all typical and complete embodiments of the ITTEM apparatus, a compressible gas is held (for any given piston-stroke position and direction) at a predetermined pressure within the compartment volume of the gas-containing spatial region of said cylinder; and this compressed gaseous mass thus serves as a reference pressure volume for the intrinsic damping-force control means located elsewhere within the apparatus. In addition, the pressurized gas within the compartment volume of the gas-containing spatial region optionally can serve as a normalization/rebound chamber for the apparatus as a whole.

This structural rule and circumstance holds true for each format of the ITTEM apparatus as a whole. However, there are in reality two recognized and expected exceptions to this general rule, which are: Those specialized circumstances such as the retrofit of a vehicle which compels or allows for only the use of a conventionally known shock absorber as a replacement; and those particular kinds of vehicles where the existing rebounding mechanism in place (such as a metal spring mechanism) precludes the use of any gas rebounding apparatus in any form. In these instances, the presently described ITTEM apparatus as such cannot be usefully employed.

3. The compressed gas contained within the compartment volume of the gas-containing spatial region is a rebounding medium. A rebounding medium has a specific stored energy; and, in the case of a compressed gas, is measurable as a specific pressure. Direct sensing of that internal gaseous pressure (as well as the transient pressure-rise at the strokeward face of the piston) allows the piston to intrinsically respond to the actual sink-rate and the actual inertial load; and to configure itself for the appropriate damping based on those factors and the remaining stroke length available to damp the kinetic fraction of the current inertial load; thereby delivering the preferred deceleration solution which is to apply a constant deceleration force for the remaining stroke length or part thereof in order to reach zero piston velocity at or before the end point of available stroke-length.

E. The Intrinsic Damping Control Means

1. In each embodiment of the ITTEM apparatus, structural intrinsic damping-force control means are integrally joined to that portion of said piston mechanism located within the internal bore volume of the cylinder. As a consequence of being located within the cylinder volume, the intrinsic damping-force control means can be constructed as either passive structural entities or active structural devices. Thus, a free choice exists and is available between the passive and active formats.

2. By definition, a passive form of intrinsic damping-force control means is a hydrodynamic, and/or flexural, and/or mechanical construct able to respond to variations of fluid flow, fluid pressure, and/or piston position within the cylinder. Such passive intrinsic damping-force control means produce the required damping without external reference.

As the alternative model, an active form of intrinsic damping-force control means is, by definition, electronically referenced to the damper's internal environmental variations of fluid flow, fluid pressure, and/or piston position within the cylinder. As such, the electronic module or other electromechanical controlling device will always be located in-situ and be positioned to exert fluid flow control internally within the available bore volume of the cylinder; will electronically and/or electro-mechanically activate and engage the passive intrinsic structural formats in order to produce and control the required damping force; and are capable of interacting with or referencing one or more inputs sent from sources located outside of and/or remotely from the bore volume of the cylinder.

3. Accordingly, structurally and without regard to type or manner of construction, each and every format of intrinsic damping-force control means will comprise:

A preformed article which
 (i) has known dimensions and configuration,
 (ii) is fashioned of a deformable material having a known coefficient of thermal expansion,
 (iii) is able to absorb the resistance of said viscous silicone-based fluid when compressed within the hydraulic fluid-containing region,
 (iv) is able to impart changes to the flow angle and flow rate of said viscous hydraulic fluid when compressed within the hydraulic fluid-containing region, (v) is sufficient to convert at least a portion of the kinetic energy then present in the flowing viscous hydraulic fluid into heat; and An annular gap of dynamically adjustable and temperature variable size located between said reformed article and each cylinder sidewall of said hydraulic fluid-containing spatial region, the annular gap serving as a lower-temperature size expanding and higher-temperature size narrowing peripheral valve which allows dynamically altered and temperature differing quantities of flowing viscous hydraulic fluid to pass through during the up-stroke and down-stroke movement of the piston mechanism.

4. Among the many structural formats available and suitable for use as the chosen intrinsic damping-force control means, one highly preferred instance and example are fluid-flow restrictive members—which typically appear as one or more baffle-like articles, with or without a an electronically activated supporting side-load bearing member.

These baffle-like articles can be a separate component attached to the piston rod, or be a formed feature on a face surface of the piston head, or be disposed upon and attached to an internal surface face of the cylinder sidewalls.

Typically, each baffle-like article is:

(i) a discrete structural feature of predetermined dimensions and overall configuration;

(ii) desirably is integrally joined to a portion of the piston rod;

(iii) is fashioned and constituted of a chemically stable and resilient formulation;

(iv) is tangibly deformable in-situ when responding to the flowing wave motions of the viscous oil (or other viscous liquid) employed as a hydraulic fluid; and (v) will thereby either increase or decrease the hydraulic fluid resistance within the cylinder—the mode of fluid flow resistance modification in question being imparted to the moving hydraulic fluid by the particular direction of the traveling piston head (during the down-stroke and the up-stroke) within the elongated bore volume of the cylinder.

5. The annular gap comprising part of the intrinsic damping-force control means will always have a perimeter edge of measurable spatial size (or diameter); and will always exist as a discernible entity between the periphery of the fluid-flow restrictive member (typically a baffle-like article) and the cylinder sidewalls or the piston. This annular gap will spatially act as a peripheral valve—i.e., a sized gateway or controlled portal for open channel flow travel of the compressed hydraulic fluid around the piston head.

The perimeter size (diameter or width dimension) of the annular gap can and will vary over the scale of fractions of the individual damping stroke; and will be a function of the hydrodynamic and flexural variations in the baffle-like article's shape and performance—based on the expected changes of fluid flow, fluid pressure, and piston stroke position within the cylinder bore. The expansion and contractions of perimeter size for the annular gap will produce the desired damping effects.

In addition, the perimeter size (diameter or width) of the annular gap is only limited by the configuration of the baffle-like article and the piston's cylindrical surface (including its leading and trailing edges). Thus, the perimeter edge and overall spatial size of the annular gap can be prepared and set to be of constant or varied dimension. This capability allows and enables the open channel pathway to accommodate and meaningfully control extremely large variations of fluid-flow speed and fluid flow direction for any given stroke-position and speed of piston motion relative to the hydraulic fluid.

6. Note that under increasing ambient or internally generated operating temperatures, the preformed baffle article (or other fluid-flow resistance means) becomes increasingly heated, thermally expands, and dimensionally grows into ever-closer adjacent proximity with the internal surface of the solid cylinder sidewalls; and thereby will markedly narrow the overall size/diameter for the open channel pathway of the annular gap then existing between the preformed baffle article and the cylinder sidewall.

Conversely, the occurrence of lower ambient operating temperatures will cause this annular gap to increase in aperture size/diameter; and thereby offer a larger-sized open channel pathway for a more rapid flow of the viscous hydraulic fluid passing through. Under these operational circumstances and in this manner, the overall resistance provided by the intrinsic damping-force control means to fluidic flow remains substantially constant, regardless of hydraulic fluid viscosity changes caused by ambient or internally generated operating temperatures.

7. Consequently, damping performance for the apparatus is consistently and uniformly maintained under all realistic operating conditions, even under extremes of cold and heat. It will be noted also that the internally generated heat is centered and focused at that zone of the ITTEM apparatus where ambient cooling is most available; and the thermally expanding annular gap allows the piston assembly to convert the kinetic energy of impact and vibration into heat by hydrodynamic means at the interface between the piston/baffle system, avoiding significant heating of the bulk silicone fluid by "squeegeeing" the heat up and down the cylinder wall surfaces for dissipation into the environment.

F. Extrinsically Activated Damping-Force Control Means

1. When optionally present, the extrinsically activated damping-force control means will be in part internally positioned within the internal bore volume of the cylinder, and in-part remotely located from the piston mechanism of the ITTEM apparatus. The extrinsic activation and communication controls, such as the electronic module shown by FIG. 6, will always lie at a fixed or known distance away and are separated from the cylinder; but will be in on-demand and active control communication with the implementation devices then disposed internally within the bore volume of the cylinder. The exact location of these remotely positioned electronic controls will vary with the particulars of the electronics chosen and the specific application requirements.

2. The extrinsically activated damping-force control means can be integrated with a variety of devices and structures then located and implemented within the internal bore volume of the cylinder, for operation remotely. Merely exemplifying these internally located implementation devices are the following:

(i) A piezoelectric ring located around the piston head which expands radially when activated;

(ii) A piezoelectrically-valved, inflatable-ring peripheral orifice choke working off differential pressure from one side of the piston to the other—with the result that a large hydro mechanical force is controlled by the electronics;

(iii) One or more configured "mission-adaptive" composite baffle structures which can be activated on-demand and purposefully directed to become either more curved or less curved in radial shape and orientation, and thus be either increased or decreased in topographical contact surface distance to meet different rates of viscous fluid flow.

3. Owing to the nature of electronic controlling devices and systems, a source of reliable electric power must be provided for operational acts. For superior damping results, the desirable electric power source(s) for activating and operating the extrinsically activated damping-force control means can take various forms, such as super capacitors; storage batteries; and other well known conventional energy sources. These electric power sources typically are fixed either externally to the ITTEM apparatus; or are positioned internally within the interior bore volume of the cylinder in the ITTEM apparatus, at pre-chosen multiple locations, including but not limited to the piston mechanism.

In addition, the true source of electric power can take one or more alternative forms, including rotary brushless generator/alternator devices associated with the piston mechanism and spun by "rifling" to catch fluid-flow (tailor-made for dual-piston and elongated piston implementations. For example, in a linear-reciprocating generation embodiment, one or more discrete magnets can be positioned upon the outside of the lower "moving" leg of the strut, or the strut itself can be magnetized; or a magnetized spring is positioned below the piston head. Any of these alternative models will allow the generation of power on the piston using a coil and a rectifier.

4. The controlling electronics, located either externally or internally within the ITTEM apparatus itself, enables granularity for the system; and makes the sensing and the processing of data space-wise and time-wise local to the events. This, in turn, provides quick detection of fluid flow changes and allows the processing of detected data to be very rapid and time-effective; and results in the electronically controlled system to meet and effectively manage the quickly changing shock impact event(s), namely the synchronization of damping speed and damping intensity with the piston stroke movement.

In one preferred embodiment of the invention, the physical implementation of the algorithm governing the ITTEM apparatus as a whole may include a control mechanism implementing a mechanical negative feedback control loop to expand or contract the baffle—and thereby seek a particular fluid pressure regardless of travel speed as a way of providing a uniform damping force from beginning of movement to zero velocity at the end of the stroke.

5. An on-demand electronic controlling system can be prepared, interconnected, and networked via conventional electrical linking means including: radio, wires, optical fibers, and even swarming methods; and usefully function as an operative system including the capability to modify behavior performance based on the previous shock's experience of the road; as well as interact with the vehicle's other on-board systems to preemptively damp effectively for an upcoming event (like a missile launch or a detected blast wave, etc.).

As merely one truly unusual example, an appropriate ITTEM apparatus and system capable of actually jumping away from and minimizing (if not completely avoiding) the injurious effects of an explosive detonation would employ a ride-height implementation control structure which is automated and may be decoupled from the spring function of the vehicle—thereby reducing the relative velocity of the explosive blast wave and the segment of the blast zone to which the vehicle is exposed, while also increasing distance from the blast center, based on detection equipment signals.

III. Modes of Damping Provided by the Present Invention

A. The ITTEM apparatus can act to provide a variety of damping capabilities which are functionally unique and can be separated into four alternative modes of damping. All of these modes exist simultaneously; and all these modes function (with some variation in overlap characteristics) transitioning from mode to mode automatically with increases or decreases in fluid flow velocity. However, which of these appears as the "dominant" mode of the moment is a function of and dependent upon the particular fluid flow velocity then in effect.

This is one the major features of and distinguishing differences for the ITTEM apparatus in comparison to most conventionally known damping devices, all of which are position or displacement dependent. The ITTEM apparatus most notably is independent of displacement, but is unusually sensitive and completely reactive to even very small changes in the velocity of fluid flow.

B. The four alternative modes of damping are:

(1) Velocity Squared Damping

With this damping mode, for every incremental increase in fluid flow velocity, the resistive force increases as a "square" of the increment of increase relative to the initial velocity. For example, if the velocity increases by a factor of 2, the delta damping force increase is a magnitude four (4) times greater than the original.

(2) Viscous Damping

In this mode, for each incremental increase in flow velocity, there is a resulting linear effective increase of resistive force. Thus, the resistive force is produced by the size (typically the piston cross-sectional area) of the object being forced through the damping medium. The force is also then, a factor of the viscosity of the damping medium. This mode appears and is functional in the upper range of subsonic flow and extends to a lower mid-range of velocities.

(3) Dashpot Damping

Dashpot damping is best understood by thinking of the classic screen door dampers that were intended to slow the motion of the door and to lessen the impact force when the door hit the door jam. Thus, at the slowest fluid flow velocities, the device acts as a dashpot, resembling a classic "screen door" damper. Because this mode becomes dominant at slower rates of fluid flow, it resembles pushing a flat faced plunger through highly viscous fluid, thus producing resistive force.

(4) Machian Damping

Machian damping relates to the transonic and faster-flow characteristics from subsonic to supersonic flow, from supersonic to hypersonic flow. Specifically, the transition from subsonic flow to supersonic or higher Machian flow is a speed-dependent damping-force component—in that during the Machian regime of fluid flow, the resistance increases with speed. This holds true for each transition; and thus demonstrates that a piston made so as to have more than one region where the annular gap increases (slowing fluid speed) and then decreases again (causing another subsonic-Machian transition)—will have more than one Machian source of damping.

Where the bow-wave or shockwave entrains within the annular gap (in the case of fluid-flow rates greater than 1) and bounces multiple times before exiting the gap, at even fairly slow strokes, this event forms a variably-permeable virtual seal which spans the annular gap; and constitutes the standing wave/mach-cone and related high-mach-number events occurring in the fluid passing the piston and its valving members. It is also clear that higher-mach-number events such as standing waves formed in flow-channels including but not limited to the annular space can be used as flow control and flow diverters which are velocity-dependent, since at a given mach number the standing waves are repeatable as to position and shape. Thus fluid-logic and switching based on the standing waves allows a much finer, more granular—at very small increments of resolution of time and/or space—control of the ITTEM's high-speed damping characteristics.

Switching from low-speed damping (where the fluid-flow through the adaptive damping-means is subsonic) to transonic-supersonic can be hydrodynamically initiated and controlled by means including but not limited to the coanda effect and it's breakdown as fluid speed approaches the transonic value and higher.

In the Machian and fractional-mach regimes, the fluid passing the annular gap exhibits many useful characteristics which can be directed by those skilled in the hydrodynamic and damping sciences and arts to tailor damping evidenced by the ITTEM, characteristics including but not limited to laminar and turbulent flow, as well as piston-face-following coanda flow, in varying combinations according to the specific tailoring of the ITTEM and its current fluid-flow rate; the mach-cone waves also serve to efficiently transform kinetic impact-energy into heat, "absorbing shocks" and dissipating that kinetic energy as heat locally through the shell of the cylinder.

IV. Exemplary Active and Passive Damping Means Effective for Managing the Exchange of Kinetic Energy The listing of Table 1 given below identifies some of the more desirable, but certainly not all, of the active and/or passive structural means which can be employed in differing embodiments of the ITTEM apparatus for managing the exchange of kinetic energy between the sprung condition and unsprung posture of a vehicle. It will be clearly understood, however, that the entire listing of Table 1 is merely exemplary and representative of such active and passive damping means; and that the particulars of the listing neither limits or restricts in any way the range and variety of particular structures and articles which may be operationally employed for this particular purpose.

TABLE 1

Piezoelectric active damping compensation controlled locally by electronics on the piston mechanism itself.
Micro-mechanical active damping compensation controlled locally by electronics on the piston mechanism itself.
External tube connecting the ends of the piston travel space from points at or beyond the maximum travel of the piston. These allow active control of damping characteristics externally by controlling restriction at the tube, as well as augmented cooling of the fluid moving through the tube.
Use of a hollow piston rod where the flowing hydraulic fluid enters a hollow piston rod from the end bolted through the piston head, and fills the linear length of the hollow piston rod with viscous fluid. This structural format allows significant weight savings; and enables the hollow piston rod to effectively resist buckling under compressive forces - with significantly less wall thickness for the rod itself, since it becomes pressurized and thus serves as an aid to resisting bucking during the down-stroke. Note also that by being in tension on the upstroke, buckling is not an issue during the up-stroke.
In some embodiments, a coil spring is contained within the cylinder bore volume between the exterior surface of the piston head and the end wall of the cylinder. The coil spring is employed for suspension/rebound management; and/or as a component of the energy-harvesting system; and/or in the case of a tubular coil spring, as a channel space for hydraulic fluid to travel from the non-spring side of the piston head to the end wall of the cylinder -where another active or passive fixed peripheral valve assembly can further moderate the fluid flow, allowing that ITTEM embodiment to have two separate and distinct modes of damping.
In those embodiments with on-board electronic controls, some electronic formats are able to network through wires, optical TABLE 1-continued fibers, or wirelessly, with one or more other modes of damping then affixed to the vehicle in question; as well as network with the vehicle's on-board electronics (which may include various sensors and computers) in order to optimize damping characteristics for the current environment; and to vary damping synchronously, or asynchronously, or both in order to prevent uncomfortable and/or destructive resonances from occurring in the vehicle and/or its sensitive components.
Units for actively sensing and remembering, over specified time durations, dominant frequencies of oscillation or resonance between the sprung and unsprung components and preemptively damping at those frequencies. These control units can also optionally offset the damping effect for a particular frequency one half wave from the use frequency; and/or optionally frequency-double the damping activity, so that ten (10) Hertz oscillation would be damped at 20 Hertz (in real world situations, earth terrain is a rectifier; and up and down motion are both motions needing control).
For the case where the piston head is mechanically affixed to move with the unsprung weight of the vehicle, the use of mechanical inertial means is very desirable. Such mechanical inertial means incorporate at least a freely moveable weight within the piston mechanism which mechanically chokes the upper baffle at the beginning of upstroke to a degree dependent on the transient acceleration; an event at which choking is locked in place by the relative overpressure on the upward side during the upstroke with a camera shutter-release-like locking mechanism that only unlocks at near pressure balance between the upper and lower sides of the piston. This format locks in a prechosen rate of damping for the upstroke which is based on the initial sink rate.
In the case of the piston being affixed to move with the sprung weight of the vehicle, the inertial sensing should be set at the unsprung weight, most practically making use of a hollow coil conduit. In this instance, as well as and the last case presented above, the annular gap size and its peripheral valving effect should be the maximum damping setting. Then, with the coil conduit or/and maximal open channel pathway space, the damping action should be set at the least value available, so that the inertial valve creates the difference between maximum and minimum damping based on unsprung-weight acceleration. It will be noted and appreciated also that this is an application suitable for locally-powered electronics as well as for mechanical options.
For washer-like baffles, the chosen embodiments can be either flat or convex in configuration; and if convex, the structures can be radially corrugated and affixed to both faces of the piston rod so that, parachute-like, they engage the relative stream of fluid approaching the respective faces. This format allows the compression force to enlarge their inner diameter during that portion of the stroke where the fluid flows toward that exposed face of the piston head - the object and result being rate-and-direction-adaptive damping induced by varying the peripheral valve orifice size and laminar-parasitic-friction-drag characteristics.
Differing baffles can be arranged in series and in particular sequence in order to produce specific damping characteristics. The sequential progressions of baffles can include but are not limited to: a first flat or slightly parachute-like baffle with fairly constant low-speed damping, which is arranged to block flow to a second and substantially more parachute-like baffle - until the hydraulic fluid flow speed forces the first baffle to decrease diameter, thereby allowing fluid flow to engage the second, substantially more parachute-like baffle. This series of baffles dramatically increases the damping-force.
Another desirable embodiment is a series of convex-shaped baffles in sequence, each of which is radially corrugated and affixed to both faces of the piston head - so that, nosecone-like, the baffle series engages the relative stream of fluid approaching their respective faces. This format allows that the flowing force of the hydraulic fluid to deform and decrease the baffles' diameter size during that portion of the stroke where the fluid flows toward that particular surface face of the piston head; the object and result of this construction being rate-and-direction-adaptive damping caused by varying the peripheral valve orifice size and laminar-parasitic-friction-drag characteristics.
If the baffle structures are radially corrugated, springy washers (very stiff vertically, but springy in terms of increasing diameter size) can be set around an inner ring/band (which might be corrugated shim stock); these corrugations running vertically

TABLE 1-continued and arranged so that pressure from either side of the piston head pushes that inner ring outward - thereby shoving the baffles outwardly in direction towards the cylinder sidewalls. This results in the potential to have a much larger value difference between the minimum and the maximum damping force, as well as a much larger value difference between the upstroke and the down-stroke of the piston mechanism; and will provide a purely mechanical basis for exerting very low-power electronic control, which can be then optionally be added to the apparatus as a whole.

For the case of active damping, sink-rate can be derived from a no-moving parts system of differing types - including, but not limited, to a microphone-like sensor on the piston or a laser-ranging unit of a laser frequency to which silicone fluid and air-bubbles are transparent, and lie internal to the strut that measures the speed of the piston relative to an end of the cylinder. This type of system arrangement allows for continuous granular (of time and space resolution comprising very small increments such as nanoseconds and thousandths of an inch) control of damping-force and the selection of damping-force frequencies to fit the moment-by-moment upstroke velocities and frequencies; will provide control signals to the active damping system where the signal's amplitude is determined by speed of motion and not by distance; and, in order that the amplitude and frequencies are synchronous with the up-strokes or down-strokes, thereby delivers appropriate frequencies and amplitudes of damping synchronously with the event being damped (either passively or actively) via amplification modalities, including but not limited to audio-type amplification chips and circuits.

In one desirable embodiment, the actively controlled ITTEM apparatus determines rate and position of the piston head (relative to the end wall of the cylinder) by means including, but not limited to, acoustic range-finding and/or acoustic doppler frequency shift. This doppler method uses a continuously rhythmically-varying complex frequency so that both time-delay for distance and frequency-shift for speed are found simultaneously using one emitter and one receiver.

For the optional ride-height adjustment (using one or more methods including, but not limited to, changing the volume of fluid in use and/or the fluid's distribution within the unit), the capabilities added to the vehicle may be chosen from: The ability to establish an upward velocity potentially exceeding that required to break contact between wheels and the ground; and the ability to provide a varying ride-height on all or some of the vehicle's wheels, for purposes of ride-height and the tilt of the vehicle (with respect to a specified inertial point of reference). The mechanism for that tilting optionally includes features including, but not limited to, regenerative tilt management; thereby allowing vehicles with four or more wheels to tilt into corners in the manner of a two-wheel motorcycle; and optionally stiffening the damping-force of the extrinsically located controls without consuming excessive energy.

Another embodiment able to provide ride-height adjustment for a vehicle is the preemptive raising of a vehicle to prepare for mass changes or kinetic events, such as receiving a load of rock or launching missiles and for gently allowing that vehicle to sink to its normal ride-height during the kinetic energy event in question, instead of bottoming out.

Still another mode of control utilizes the flow speed of the hydraulic fluid. Often, the speed of the silicone-based oil in the peripheral orifice [owing to the 1 to 1000 ratio between the peripheral orifice cross-sectional area and the cylinder cross-sectional area at a sink rate of 30 feet per second] is 30000 feet per second or mach 6.8 (sound travels 4,429 fps in silicone-based oil; and thus even a sink rate of 4.5 fps produces peripheral valve flow-rates that are still transonic). The mach cone shock wave generated by the piston compression force not only contributes to damping in those regimes; it also prevents contact between the piston and the cylinder. Thus, one or more alternate open channel pathways for the flowing viscous fluid, such as one created by a tubular coil-spring, will also exhibit standing-waves as the fluid-flow through them, at sink-rates of interest. This application will typically occur with transonic or supersonic flow speeds - i.e., those speeds with a mach number greater than one. In addition, the generation of the mach cone shock waves converts kinetic energy to thermal energy which is dissipated efficiently through the walls of the damper, a core function of impact dissipation of this damper.

V. Expected Uses and Intended Applications for the ITTEM Apparatus

1. In accordance with one aspect of the invention, the ITTEM is adapted for uses in which side loadings or bending forces are encountered—e.g., MacPherson struts.

Under these operational conditions, a load-bearing element having a plurality of peripheral ports alternated with load-bearing segments is employed in association with the piston head; or, alternatively, the fluid flow can be primarily in an external channel connecting the end points of the cylinder, at or beyond the maximum travel points of the piston.

However, for a McPherson-Strut application, the side-load would be better done with bushings having large flow ports, such bushings being independent of the annular gap.

2. The ITTEM apparatus is particular suited and adapted for use in aviation or for other applications involving those entities commonly known as oleo struts. For these embodiments, a separate gas pressurization canister is concentrically disposed about and reciprocally engaged with the rebound end of the cylinder in the ITTEM apparatus.

Those skilled in the art will appreciate and understand that the ITTEM apparatus intended for aircraft use or oleo strut applications presents structural improvements, progressive compression, and rebound valving; and also eliminates fluid contamination and leakage. In these embodiments, there are no piston seals or other wear parts crucial to compression dampening.

3. Other expected uses of and intended applications for the ITTEM apparatus include, but are not limited to:

(a) Damping for seat mounts in MRAP type vehicles, particularly suited to embodiments such as 3-axis-of-freedom seat mounts using progressive coil-springs to create preload at the zero point;

(b) Truck body isolation dampers;

(c) Hydraulically regenerative vehicle-leveling and CG-management systems;

(d) Embodiments with integrated springs added to inertial reel seat-belt lock systems and which allow impact attenuation;

(e) Earthquake dampers for buildings; and (f) Deck and equipment silent mountings in submarines.

What we claim is:

1. An inertial terrain transit event manager apparatus suitable for managing initial impact forces as well as controlling rebound shock effects, said apparatus comprising:

(1) an elongated hollow cylinder having a solid end wall with a pre-sized opening, a closed solid end wall, at least two oppositely positioned solid sidewalls, and an extended internal bore volume;

(2) a pressure-resistant compartment barrier disposed independently in transverse position within said internal bore volume between said oppositely positioned sidewalls of said hollow cylinder, said disposed compartment barrier being a discrete structural interface which completely and permanently divides said extended internal bore volume of said cylinder into two constructed, separated, and adjacently located internal closed cells wherein each of said adjacently located internal closed cells exists as a constantly present closed cell having a confined spatial region;

(3) a constantly present gas-containing compartment constituted as one of said adjacently located closed cells existing internally within said cylinder, said constituted internal gas-containing compartment including (i) an established confined spatial region having fixed dimensions, configuration and volume, (ii) a gas portal able to introduce pressurized gas on-demand into said established confined spatial region, and
(iii) a predetermined mass of compressible gas which has been introduced into and is held at a prechosen pressure within said confined spatial region of said constantly present gas-containing compartment, said predetermined mass of compressible gas serving as a permanent positioned pressure source which counteracts in part the compression shock effect caused by impact forces,
(iv) at least one sensor operative for determining the current internal gaseous pressure of and for measuring the transient pressure-changes of gas within said established confined spatial region, whereby the current and transient changes in internal gaseous pressure detected by said sensor initiate an adjustment in the mass of compressible gas held within said constantly present gas-containing compartment;
(4) a constantly present hydraulic fluid-containing compartment constituted as the other of said adjacently located closed cells existing internally within said cylinder, said constituted internal hydraulic fluid-containing compartment including
(A) a set confined spatial region having specified dimensions, configuration and volume, and
(B) a blended, silicone-based viscous hydraulic fluid disposed within said confined spatial region of said constantly present hydraulic fluid-containing compartment, and which ranges in viscosity from about 10 centistokes to about 600,000 centistokes, and is capable of flow motion;
(5) an operative reciprocating piston mechanism disposed within said hollow cylinder and concurrently is moveable through said established confined spatial region of said constantly present gas-containing compartment and said pressure-resistant compartment barrier and said set confined spatial region of said constantly present hydraulic fluid-containing compartment, said reciprocating piston mechanism being comprised of
(α) at least one piston head which is located only and is displaceable solely within said set confined spatial region of said constantly present hydraulic-fluid containing compartment, wherein the physical displacement of said piston head within said constantly present hydraulic-fluid containing compartment creates a compression force, which imparts kinetic energy in-situ to said viscous hydraulic fluid, and causes said viscous hydraulic fluid to flow within the volumetric confines of said constantly present hydraulic-fluid containing compartment,
(β) a piston rod of predetermined length joined to said displaceable piston head within said set confined spatial region of said constantly present hydraulic fluid-containing compartment, wherein said piston rod passes from the ambient environment through said pre-sized opening in said solid end wall into the interior of said cylinder, and
said piston rod then continues internally within said cylinder, and extends through said established confined spatial region of said constantly present gas-containing compartment, and concurrently passes through said interface pressure-resistant compartment barrier, and concomitantly extends into said set confined spatial region of said constantly present hydraulic fluid-containing compartment for juncture with said position head, and
said piston rod is capable of up-strokes and down-strokes repeatedly as disposed within said established confined spatial region of said constantly present gas-containing compartment, and as concurrently disposed through said interface pressure-resistant compartment barrier, and as concomitantly disposed within said set confined spatial region of said constantly present hydraulic fluid-containing compartment, and
the movement of said piston rod within said established confined spatial region of said constantly present gas-containing compartment will concomitantly initiate a physical displacement of said piston head within said constantly present hydraulic fluid-containing compartment;
(6) intrinsic damping-force control means joined to that portion of said reciprocating piston mechanism which is located solely within said set confined spatial region of said constantly present hydraulic fluid-containing compartment and which will interact in-situ with said viscous hydraulic fluid, wherein said intrinsic damping-force control means comprises a discrete preformed damping article which
(i) has known dimensions and configuration,
(ii) is fashioned of a deformable material having a known coefficient of thermal expansion,
(iii) is able to absorb the resistance of said viscous hydraulic fluid when compressed within said set confined spatial region of said constantly present hydraulic-fluid-containing compartment,
(iv) is able to impart dynamic changes to the flow angle and flow rate of said compressed viscous hydraulic fluid within said set confined spatial region of said constantly present hydraulic fluid-containing compartment,
(v) is sufficient to convert at least a portion of the kinetic energy then present in said compressed viscous hydraulic fluid into heat;
(7) at least one annular gap of temperature variable size which is located within said set confined spatial region of said constantly present hydraulic fluid-containing compartment and which exists as an open channel pathway between said intrinsic damping-force control means and a sidewall of said constantly present hydraulic fluid-containing compartment, each said annular gap serving as
(a) a higher-temperature size expanding and lower-temperature size narrowing peripheral control valve,
(b) a release portal of temperature variable size for the ingress and egress of flowing viscous fluid waves directed by said intrinsic damping-force control means within said constantly present hydraulic fluid-containing compartment,
(c) a pathway which allows dynamically altered and temperature-differing quantities of flowing viscous hydraulic fluid to pass through during the up-stroke and down-stroke movement of said reciprocating piston mechanism, and which acts in combination with said intrinsic damping-force control means to provide enhanced shock absorbing capabilities and effective damping;
and
(8) extrinsically activated damping-force electronic control means positioned in-part externally to said hollow cylinder and disposed in-part within said extended internal bore volume of said hollow cylinder, wherein said extrinsically applied damping-force electronic control means includes
  (i) a plurality of measuring and recording sensors suitable for gathering data about the current conditions for and operating performance of said reciprocating piston mechanism disposed within said extended internal bore volume of said hollow cylinder,
  (ii) at least one electronic module which is in controlling communication with said piston head and that portion of said piston rod disposed within said set confined spatial region of said constantly present hydraulic fluid-containing compartment, and which concurrently is in controlling communication with that portion of said piston rod disposed within said established confined spatial region of said constantly present gas-containing compartment,
  (iii) active communication controls able independently to direct and to control the addition of pressurized gas as necessary into said established confined spatial region of said constantly present gas-containing compartment, and
  (iv) active communication controls able to vary adaptively the strength and duration of damping force and rebound then being applied to the kinetic energy of said flowing viscous hydraulic fluid within said set confined spatial region of said constantly present hydraulic fluid-containing compartment.

2. The inertial terrain transit event manager apparatus as recited in claim 1 wherein said hollow cylinder is formed as a single housing comprised of an upper solid end wall having an opening, a closed lower solid end wall, two discrete solid sidewalls, and an extended internal bore volume.

3. The inertial terrain transit event manager apparatus as recited in claim 1
  wherein said hollow cylinder is formed as a unified cylinder casing comprised of an outer cylinder envelope which surrounds a portion of and is fitted tightly over a inner cylinder chamber, and
  wherein said outer cylinder envelope includes an upper wall having an open end and two discrete solid outer sidewalls, and
  wherein said inner cylinder chamber includes a closed lower wall and two discrete solid inner sidewalls.

4. The inertial terrain transit event manager apparatus as recited in claim 1 wherein said hollow cylinder further comprises a substantially non-absorbent compressible member disposed within the bore volume adjacent said closed end wall of said cylinder.

5. The inertial terrain transit event manager apparatus as recited by claim 1 wherein a surface of said cylinder sidewalls is serrated along its periphery.

6. The inertial terrain transit event manager apparatus as recited by claim 1 wherein a surface of said cylinder sidewalls is longitudinally-grooved along its periphery.

7. The inertial terrain transit event manager apparatus as recited in claim 1 wherein said pressure-resistant compartment barrier is comprised of a pressure-tight fitted cap and a resilient fluid-tight plate.

8. The inertial terrain transit event manager apparatus as recited in claim 1 wherein said pressure-resistant compartment barrier is formed of a suitable, flexible, non porous material.

9. The inertial terrain transit event manager apparatus as recited in claim 1 wherein said viscous hydraulic fluid exhibits pseudo-plastic flow under extreme shear.

10. The inertial terrain transit event manager apparatus as recited in claim 1 wherein said viscous hydraulic fluid has a viscosity temperature coefficient below about 0.6.

11. The inertial terrain transit event manager apparatus as recited in claim 1 wherein said viscous hydraulic fluid is a polydimethylsiloxane silicone oil.

12. The inertial terrain transit event manager apparatus as recited in claim 1 wherein a portion of said piston rod is formed as a solid article.

13. The inertial terrain transit event manager apparatus as recited in claim 1 wherein a portion of said piston rod is formed as a hollow rod.

14. The inertial terrain transit event manager apparatus as recited in claim 1 wherein said piston head further comprises at least one side-load bearing member having at least one of a plurality of recesses in an outer peripheral edge thereof.

15. The inertial terrain transit event manager apparatus as recited in claim 1 wherein said piston head includes a thermal expansion member.

16. The inertial terrain transit event manager apparatus as recited in claim 1 wherein said piston head comprises at least one side-load bearing member having at least one recess in an outer peripheral edge thereof.

17. The inertial terrain transit event manager apparatus as recited in claim 16 wherein said piston head and said cylinder are formed of materials having substantially equal coefficients of thermal expansion.

18. The inertial terrain transit event manager apparatus as recited in claim 1 wherein said piston head further comprises
  a generally conical-shaped member,
  a generally cup-shaped member, and
  a thermal expansion member interdisposed between them.

19. The inertial terrain transit event manager apparatus as recited in claim 18 wherein said generally conical-shaped member and said generally cup-shaped member are selected of a material having a coefficient of thermal expansion less than or equal to that of said thermal expansion member.

20. The inertial terrain transit event manager apparatus recited by claim 1 wherein the topography of the compression-stroke surface face of said piston is selected from the group consisting of helical, conic, flat, domed, concave, parabolic doomed, parabolic concave, concave toroidal shaped surfaces, and concave-flat rotating toroidal surfaces.

21. The inertial terrain transit event manager apparatus recited by claim 20 further comprising a toroidal "smoke ring vortex" wherein the direction of toroidal spin is substantially similar to the direction of hydraulic fluid flow.

22. The inertial terrain transit event manager apparatus as recited in claim 1 wherein said preformed damping article of said intrinsic damping-force control means is a baffle structure.

23. The inertial terrain transit event manager apparatus as recited in claim 22 wherein said baffle structure has a support member coaxially aligned therewith to secure said structure and to permit deformation only of an outer peripheral portion thereof.

24. The inertial terrain transit event manager apparatus as recited in claim 1 wherein said intrinsic damping-force control means is selected from the group consisting of active and passive fluid-flow restrictive members.

25. The inertial terrain transit event manager apparatus as recited in claim 1 wherein said intrinsic damping-force control means is variably implemented with respect to the changes incurred by an impact force.

26. The inertial terrain transit event manager apparatus as recited in claim 25 wherein said changes caused by said intrinsic damping-force control means are selected from the group consisting of alterations in magnitude, alterations of velocity, and alterations in the rate of acceleration of impact force upon the sprung position and un-sprung posture of a vehicle.

27. The inertial terrain transit event manager apparatus as recited in claim 1 wherein said intrinsic damping-force control means comprises at least one spring system to restore the height distance between the sprung position and unsprung posture of a vehicle.

28. The inertial terrain transit event manager apparatus as recited in claim 1 wherein said intrinsic damping-force control means includes a source of electric power selected from the group consisting of pre-set fluid-logic systems, hydraulic energy-harvesting subsystems, power generating systems for producing electricity mechanically, magnetically and regeneratively, and units of stored electric power.

29. The inertial terrain transit event manager apparatus as recited in claim 22 wherein said baffle structure has a support member coaxially aligned therewith to secure said baffle structure and to permit deformation only of an outer peripheral portion thereof.

30. The inertial terrain transit event manager apparatus as recited in claim 1 wherein said extrinsically activated damping-force electronic control means comprises a remotely located electronic control module.

31. The inertial terrain transit event manager apparatus as recited in claim 1 wherein said extrinsically activated damping-force electronic control means employs a piezoelectric ring disposed around said piston head and which expands radially when activated remotely as an implementation device.

32. The inertial terrain transit event manager apparatus as recited in claim 1 wherein said extrinsically activated damping-force electronic control means employs a piezoelectrically-valved inflatable-ring peripheral orifice choke which uses differential pressure from one side of the piston and which is activated remotely as an implementation device.

33. The inertial terrain transit event manager apparatus as recited in claim 1 wherein said extrinsically activated damping-force electronic control means employs at least one composite baffle structure which can be activated remotely and directed to become either more curved or less curved in orientation as an implementation device.

34. The inertial terrain transit event manager apparatus recited by claim 1 further comprising an entrained and poly-reflected mach-cone vortex within said annular gap.

* * * * *